(12) United States Patent
Tsuchida

(10) Patent No.: US 12,259,473 B2
(45) Date of Patent: Mar. 25, 2025

(54) OPTICAL MEASUREMENT DEVICE AND MEASUREMENT METHOD

(71) Applicant: NATIONAL INSTITUTE OF ADVANCED INDUSTRIAL SCIENCE AND TECHNOLOGY, Tokyo (JP)

(72) Inventor: Hidemi Tsuchida, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 988 days.

(21) Appl. No.: 17/293,066

(22) PCT Filed: Nov. 15, 2019

(86) PCT No.: PCT/JP2019/044883
§ 371 (c)(1),
(2) Date: May 12, 2021

(87) PCT Pub. No.: WO2020/110779
PCT Pub. Date: Jun. 4, 2020

(65) Prior Publication Data
US 2021/0405194 A1    Dec. 30, 2021

(30) Foreign Application Priority Data

Nov. 28, 2018  (JP) .................. 2018-222416

(51) Int. Cl.
*G01S 17/34*    (2020.01)
*G01S 7/48*    (2006.01)
*G01S 17/58*    (2006.01)

(52) U.S. Cl.
CPC ............ *G01S 17/34* (2020.01); *G01S 7/4808* (2013.01); *G01S 17/58* (2013.01)

(58) Field of Classification Search
CPC ...... G01S 17/34; G01S 17/4808; G01S 17/58; G01S 7/4911; G01S 7/4913; G01S 7/4915; G01S 7/4917; G01S 7/493; G01S 7/497
(Continued)

(56) References Cited

U.S. PATENT DOCUMENTS 4,912,530 A    3/1990   Bessho ...................... 356/349
6,580,497 B1   6/2003   Asaka et al. ................ 356/28.5
(Continued)

FOREIGN PATENT DOCUMENTS

JP    01-206283 A    8/1989
JP    2000-111312 A  4/2000
(Continued)

OTHER PUBLICATIONS

International Search Report mailed Jan. 28, 2020 in corresponding PCT International Application No. PCT/JP2019/044883.
(Continued)

*Primary Examiner* — Daniel L Murphy
(74) *Attorney, Agent, or Firm* — OSTROLENK FABER LLP

(57) ABSTRACT

An optical measurement device and an optical measurement method that can accurately measure a distance and a velocity by removing an influence of a nonlinear chirp of a laser in FMCW LiDAR. The optical measurement device includes a laser that outputs light of which a frequency is modulated; a photodetector; a heterodyne optical system that splits output light of the laser into two components, uses one as probe light, uses the other as reference light, adds a frequency shift to one of the probe light and the reference light, applies the probe light to an object, combines scattered light from the object and the reference light, and causes the
(Continued)

combined light to be incident on the photodetector; an IQ detector; and an arithmetic operation processor.

10 Claims, 12 Drawing Sheets

(58) Field of Classification Search
USPC .......................................................... 356/5.01
See application file for complete search history.

(56) References Cited

U.S. PATENT DOCUMENTS

| 2009/0135403 | A1 | 5/2009 | Aebischer et al. | 356/5.1 |
| 2010/0085992 | A1 | 4/2010 | Rakuljic et al. | 372/20 |
| 2012/0106579 | A1 | 5/2012 | Roos et al. | 372/20 |
| 2015/0071315 | A1 | 3/2015 | Roos et al. | 372/20 |

FOREIGN PATENT DOCUMENTS

| JP | 2000-338244 A | 12/2000 |
| JP | 2003-240852 A | 8/2003 |
| JP | 2006-513399 A | 4/2006 |
| JP | 2008-514910 A | 5/2008 |
| JP | 2013-238474 A | 11/2013 |
| JP | 2017-181269 A | 10/2017 |
| JP | 2018-141821 A | 9/2018 |
| JP | 2018-185347 A | 11/2018 |
| WO | WO 03/102625 A1 | 12/2003 |
| WO | WO 2006/035199 A1 | 4/2006 |
| WO | WO 2013/124678 A2 | 8/2013 |
| WO | WO 2017/216581 A1 | 12/2017 |

OTHER PUBLICATIONS

Written Opinion mailed Jan. 28, 2020 in corresponding PCT International Application No. PCT/JP2019/044883.
Hidemi Tsuchida, Waveform measurement technique for phase/frequency-modulated lights based on self-heterodyne interferometry, Optics Express, vol. 25, No. 5, pp. 4793-4799, Mar. 2017.
Hidemi Tsuchida, "Digital Coherent LiDAR," Optical alliance, vol. 29, No. 9, pp. 2-5, Sep. 2018, (see ISR for relevance).

OPTICAL MEASUREMENT DEVICE AND MEASUREMENT METHOD

CROSS-REFERENCE TO RELATED APPLICATIONS

The present application is a 35 U.S.C. §§ 371 national phase conversion of PCT/JP2019/044883, filed Nov. 15, 2019, which claims priority to Japanese Patent Application No. 2018-222416, filed Nov. 28, 2018, the contents of which are incorporated herein by reference. The PCT International Application was published in the Japanese language.

TECHNICAL FIELD

The present invention relates to an optical measurement device and an optical measurement method that are suitable for environment recognition sensors of vehicles, autonomous robots, or the like.

BACKGROUND ART

Development of laser imaging detection and ranging (LiDAR) for the purpose of application to environment recognition sensors of vehicles or autonomous robots, shape measurement in construction or civil engineering sites, and the like has progressed. Time-of-flight (ToF)-based LiDAR, which has been already commercialized, serves to generate three-dimensional distance data by applying light pulses to an object, measuring a distance from a time until the light pulses are scattered and returned, and performing a spatial scan with the applied light pulses.

In such ToF-based LiDAR, scattered light from an object is detected by direct detection. On the other hand, a frequency modulated-continuous wave (FMCW) system using coherent detection is characterized in that scattered light can be detected with high sensitivity and a movement speed in addition to a distance to an object can be measured from a Doppler shift. An FMCW radar in a millimeter wave range has been commercialized as a vehicular collision prevention sensor. If FMCW LiDAR can be realized in a light wave range, outstanding improvement in spatial resolution can be expected. Present FMCW LiDAR has a complicated device configuration and requires a laser light source with high coherence, and thus applicability thereof is limited.

FIGS. 14(a), 14(b), 14(c), and 14(d) are diagrams illustrating an operation principle of FMCW LiDAR in the related art. An FMCW LiDAR device illustrated in FIG. 14(a) includes a triangular wave signal generator 27, an injection current source 2, a semiconductor laser 3, beam splitters 6a and 6b, a light circulator 7, a reflector 9, and a photodetector 14. An output of the triangular wave signal generator 27 that generates a triangular wave is input to the injection current source 2 and an injection current of the semiconductor laser 3 is modulated. Output light of the semiconductor laser 3 is split into two components, one component is used as probe light 11, and the other component is used as reference light 10. Reference light is light of which the phase is synchronized with the probe light and which serves as a reference for an optical delay. A homodyne optical system 30 is constituted by the beam splitters 6a and 6b, the light circulator 7, and the reflector 9. The probe light 11 is applied to an object 13, scattered light 12 from the object 13 and the reference light 10 are combined, and the combined light is input to the photodetector 14 to generate a beat signal 15.

FIG. 14(b) is a diagram illustrating waveforms of frequencies of the reference light 10, the scattered light 12, and the beat signal 15. The light frequency of the semiconductor laser 3 periodically repeats up and down chirps corresponding to a triangular wave which is output from the triangular wave signal generator 27. In comparison with the reference light 10, a time delay based on a distance to the object 13 is generated in the scattered light 12, and a beat signal 15 of a frequency proportional to the time delay is generated in the output of the photodetector 14. Since the frequency of the beat signal 15 has a constant value except in the vicinity of a vertex of the triangular wave at which the frequencies of the reference light 10 and the scattered light 12 cross each other, the time delay, that is, the distance to the object 13, can be calculated by calculating a beat frequency through spectrum analysis or the like.

The beat frequency fa which is measured by the FMCW LiDAR can be expressed by the following expression.

[Math. 1]

$$f_B = \frac{\Delta v}{T_m/2} \cdot \frac{2L}{c} \quad (1)$$

Here, $\Delta v$ is a chirp bandwidth, $T_m=1/f_m$ is a modulation period, $f_m$ is a modulation frequency, L is a distance to the object 13, and c is the speed of light. In Expression (1), $\Delta v/(T_m/2)$ denotes a change in frequency per unit time, that is, a chirp rate. In order to calculate the distance L from the beat frequency $f_B$, the chirp rate needs to be calculated in advance.

A case in which the object 13 stops has been described above, and a case in which the object 13 moves at a velocity V will be described below. In a direction in which the object 13 becomes farther from the semiconductor laser 3, it is defined that V>0. The scattered light 12 is subjected to a Doppler shift due to movement of the object 13, and thus the beat frequency thereof changes. FIG. 14(c) is a diagram illustrating waveforms of the frequencies of the reference light 10, the scattered light 12, and the beat signal 15 when the velocity V is positive and FIG. 14(d) is a diagram illustrating waveforms of the frequencies of the reference light 10, the scattered light 12, and the beat signal 15 when the velocity V is negative. When the object 13 stops, the beat frequencies generated in the time domains of the up and down chirps are the same. On the other hand, when the object 13 moves, a difference based on the velocity V is generated therebetween.

The beat frequencies $f_{up}$ and $f_{down}$ generated in the time domains of the up and down chirps can be expressed by the following expressions.

[Math. 2]

$$f_{up} = \frac{\Delta v}{T_m/2} \cdot \frac{2L}{c} - \frac{2v_0 V}{c} f_B - \Delta f_D \quad (2)$$

[Math. 3]

$$f_{down} = \frac{\Delta v}{T_m/2} \cdot \frac{2L}{c} - \frac{2v_0 V}{c} f_B - \Delta f_D \quad (3)$$

Here, $v_0$ is a light frequency. In Expressions (2) and (3), the first term represents a component of a time delay based on the distance to the object 13 and the second term represents a Doppler shift $\Delta f_D$ based on movement of the object 13.

The distance L to the object and the speed V of the object can be calculated using the following expressions by measuring the values of the beat frequencies $f_{up}$ and

[Math. 4]
$$L = \frac{cT_m}{8\Delta v}(f_{up} + f_{down}) \quad (4)$$

[Math. 5]
$$V = \frac{c}{4v_0}(f_{up} - f_{down}) \quad (5)$$

Expressions (4) and (5) represent that the sum of the beat frequencies $f_{up}$ and $f_{down}$ corresponds to the distance and the difference therebetween corresponds to a velocity.

Calculation of the distance and the velocity using Expressions (4) and (5) is based on the premise that the beat frequencies $f_{up}$ and $f_{down}$ are in a positive domain, that is, the beat frequency $f_B$ due to the distance to the object 13 is greater than the Doppler shift $\Delta f_D$. In conditions in which the value of Expression (4) or Expression (5) is negative, the absolute value thereof is detected as a beat frequency and thus the distance L and the velocity V cannot be correctly calculated. Accordingly, the following conditions are added.

[Math. 6]
$$\frac{\Delta v}{T_m/2} \cdot \frac{2L}{c} > \left|\frac{2v_0 V}{c}\right| \quad (6)$$

Expression (6) represents that a measurable distance is limited according to the movement velocity V of the object 13. That is, distances less than a distance $L_{min}$ expressed by the following expression cannot be measured.

[Math. 7]
$$L_{min} = \frac{v_0 T_m}{2\Delta v}|V| \quad (7)$$

In order to measure close distances, it is necessary to increase the beat frequency $f_B$, that is, to increase the modulation frequency $f_m$ or the chirp bandwidth $\Delta v$. In the above description, it is assumed that the object 13 is moving, but a Doppler shift is also similarly generated due to a relative velocity therebetween when the measurement device is moving and when both the object 13 and the measurement device are moving. Accordingly, the value calculated by Expression (5) is a relative velocity.

A distance resolution in the FMCW LiDAR will be described below. The distance resolution $\delta L$ can be expressed by the following expression.

[Math. 8]
$$\delta L = \frac{c}{2\Delta v} \quad (8)$$

The resolution in Expression (8) is a capability of separately detecting two scattering points close to each other. When the number of scattering points is one, it is possible to measure a distance with higher accuracy. Since the distance resolution $\delta L$ is inversely proportional to the chirp bandwidth $\Delta v$, the chirp bandwidth needs to be increased to acquire a high resolution. For example, the chirp bandwidths required to acquire resolutions of 10 cm and 1 cm are 1.5 GHz and 15 GHz, respectively. When the number of scattering points is one, the accuracy is also inversely proportional to the chirp bandwidth.

The linearity of a chirp is very important in calculating a distance and a velocity from the value of the beat frequency. The beat frequencies in Expressions (1), (2), and (3) are based on the premise that the frequency of the semiconductor laser 3 increases (up-chirps) or decreases (down-chirps) in proportion to time. When the light frequency changes nonlinearly with time, the beat frequency which should be constant changes and thus the distance and the velocity cannot be uniquely determined.

A semiconductor laser operating in an eye-safe wavelength range is expected as a light source for FMCW LiDAR with a small size and a low cost, because it can directly modulate the frequency by modulating the injection current. Since the frequency modulation of the semiconductor laser is based on a thermal effect and frequency response characteristics thereof are not smooth, it is known that a nonlinear chirp occurs remarkably. In the frequency modulation using a triangular wave, it has been reported that a frequency component not included in a modulation signal is generated due to the nonlinear chirp (see Non Patent Literature 1).

Methods for curbing or reducing an influence of such a nonlinear chirp in FMCW LiDAR can be roughly classified into two methods. One is a method of acquiring a desired linear chirp by controlling modulation of a semiconductor laser. The other is a method of removing an influence of a nonlinear chirp by processing a detected beat signal.

A device and a method for optically detecting a frequency variation of a laser and controlling an error from a triangular wave serving as a reference to the laser by negative feedback have been reported as follows (see Patent Literatures 1 to 3). A homodyne or heterodyne interferometer which is different from an optical system for measuring a distance is prepared and a frequency variation of the laser is detected. It is possible to curb a nonlinear chirp by controlling an injection current of the laser by negative feedback using a difference between the detected frequency of the laser and a reference signal as an error signal.

A method of monitoring a frequency modulation signal or a laser output, controlling a modulation signal generator, correcting a detected beat signal, and calculating a distance has been reported as follows (see Patent Literature 4). A phase of laser output light is mathematically modeled, parameters included in the model are estimated form the monitoring result, control and signal processing are performed, and a distance is calculated.

In FMCW LiDAR of millimeter waves, a device that optically detects a frequency of millimeter waves and curbs an influence of a nonlinear chirp by signal processing has been reported as follows (see Patent Literature 5). A millimeter wave signal which is output is converted to an optical signal, and a beat signal is detected and converted to a pulse signal by a homodyne interferometer. The pulse signal includes information of a nonlinear chirp, and it is possible to curb an influence of the nonlinear chirp by AD-converting the beat signal using the pulse signal as a clock.

CITATION LIST

Patent Literature

[Patent Literature 1]
Japanese Unexamined Patent Application, First Publication No. 2000-111312
[Patent Literature 2]
United States Patent Application, Publication No. 2010/0085992
[Patent Literature 3]
United States Patent Application, Publication No. 2012/0106579
[Patent Literature 4]
United States Patent Application, Publication No. 2009/0135403
[Patent Literature 5]
Published Japanese Translation No. 2008-514910 of the PCT International Publication Non Patent Literature

[Non Patent Literature 1]
H. Tsuchida, "Waveform measurement technique for phase/frequency-modulated lights based on heterodyne interferometry," Optics Express, vol. 25, no. 5, pp. 4793-4799 (March, 2017)

SUMMARY OF INVENTION

Technical Problem

In FMCW LiDAR using a semiconductor laser as a light source, there is a problem in that a beat frequency which should be constant changes due to a nonlinear variation of a light frequency with time and a distance and a velocity cannot be uniquely calculated.

In the aforementioned method of curbing or reducing an influence of a nonlinear chirp (see Patent Literatures 1 to 3), since the nonlinear chirp is curbed by negative feedback control of the laser, it is necessary to generate an error signal in real time. Accordingly, a homodyne or heterodyne interferometer needs to be provided. In the method of performing control of the modulation signal generator and correction of a detection signal (see Patent Literature 4), an optical device such as an interferometer is needed. Patent Literature 5 discloses a technique associated with a millimeter wave radar device, but can also be applied to FMCW LiDAR in an optical range. However, since a clock of an AD converter needs to be generated in real time, a homodyne interferometer is necessary.

In the FMCW LiDAR according to the related art, when a measurement device and an object move relative to each other, there is a problem in that close distances and velocities cannot be correctly measured due to a Doppler shift.

The inventor applied a device and a method for calculating a distance from an average value of frequencies of a beat signal using a homodyne optical system for the purpose of removing an influence of a nonlinear chirp (Japanese Patent Application No. 2017-165940). In this application, since the homodyne optical system is used, it is difficult to measure a velocity. In addition, there is a problem that a distance cannot be correctly calculated due to an influence of a Doppler shift when an object is moving.

In this way, in the related art, a device for detecting and controlling frequency modulation separately from an optical system for measuring a distance and a velocity is necessary and thus a device configuration is complicated. There is a problem in that close measurement is not correctly performed due to relative movement of the measurement device and an object. If a LiDAR system with a simple configuration, a small size, and a low cost can be realized as a device for measuring an optical distance, a velocity, or a distance and a velocity, development of the LiDAR system in consumer products such as a vehicular collision prevention sensor and a pedestrian detection sensor can be expected.

The invention was made to solve the aforementioned problems in FMCW LiDAR and an objective thereof is to provide an optical measurement device and an optical measurement method that can accurately measure at least one of a distance and a velocity by removing an influence of a nonlinear chirp of a laser without using an additional device such as an interferometer.

Solution to Problem

In order to achieve the aforementioned objective, the invention has the following features.

(1) An optical measurement device including: a laser that outputs light of which a frequency is modulated; a photodetector; a heterodyne optical system that splits output light of the laser into two components, uses one as probe light, uses the other as reference light, adds a frequency shift to one of the probe light and the reference light, applies the probe light to an object, combines scattered light from the object and the reference light, and causes the combined light to be incident on the photodetector; an IQ detector that detects an in-phase component I and an orthogonal component Q of a beat signal which is generated from the photodetector; and an arithmetic operation processor that calculates a phase and a frequency of the beat signal from the in-phase component I and the orthogonal component Q and performs at least one of an arithmetic operation of calculating a velocity of the object from the frequency and an arithmetic operation of calculating a distance to the object from the phase.

(2) The optical measurement device according to (1), wherein the arithmetic operation processor calculates a Doppler shift due to movement of the object and a velocity from an average value of the frequency.

(3) The optical measurement device according to (1) or (2), wherein the arithmetic operation processor excludes a component of the Doppler shift from the phase, calculates an average value of absolute values of the phase, and calculates the distance to the object on the basis of a proportional relationship between a distance and the average value of the absolute values of the phase which has been calibrated in advance.

(4) The optical measurement device according to any one of (1) to (3), further including a two-channel AD converter that acquires the in-phase component I and the orthogonal component Q detected by the IQ detector as a digital IQ signal, wherein the digital IQ signal is input to the arithmetic operation processor and the phase and the frequency of the beat signal are calculated from the digital IQ signal.

(5) The optical measurement device according to any one of (1) to (3), further including a one-channel AD converter that acquires the beat signal generated from the photodetector as a digital RF signal, wherein the IQ detector detects the in-phase component I and the orthogonal component Q from the digital RF signal, and wherein the arithmetic operation processor calculates the phase and the frequency of the beat signal from the in-phase component I and the orthogonal component Q.

(6) The optical measurement device according to any one of (1) to (5), wherein the frequency shift is greater than frequencies included in the in-phase component I and the orthogonal component Q.

(7) The optical measurement device according to any one of (1) to (6), wherein a frequency modulation signal of the laser is a sinusoidal wave.

(8) An optical measurement method including: splitting output light of a laser that outputs light of which a frequency is modulated into two components, using one as probe light, using the other as reference light, adding a frequency shift to one of the probe light and the reference light, applying the probe light to an object, combining scattered light from the object and the reference light, and causing the combined light to be incident on a photodetector; detecting an in-phase component I and an orthogonal component Q of a beat signal which is generated from the photodetector; calculating a phase and a frequency of the beat signal from the in-phase component I and the orthogonal component Q; and performing at least one of an arithmetic operation of calculating a velocity of the object from the frequency and an arithmetic operation of calculating a distance to the object from the phase.

(9) The optical measurement method according to (8), wherein the arithmetic operation of calculating the velocity of the object from the frequency includes calculating a Doppler shift due to movement of the object and a velocity from an average value of the frequency.

(10) The optical measurement method according to (8) or (9), wherein the arithmetic operation of calculating the distance to the object from the phase includes excluding a component of the Doppler shift from the phase, calculating an average value of absolute values of the phase, and calculating the distance to the object on the basis of a proportional relationship between a distance and the average value of the absolute values of the phase which has been calibrated in advance.

(11) The optical measurement method according to any one of (8) to (10), wherein the in-phase component I and the orthogonal component Q are converted to a digital IQ signal and the phase and the frequency of the beat signal are calculated from the digital IQ signal at the time of detecting the in-phase component I and the orthogonal component Q of the beat signal generated from the photodetector and calculating the phase and the frequency of the beat signal from the in-phase component I and the orthogonal component Q.

(12) The optical measurement method according to any one of (8) to (10), wherein the beat signal is converted to a digital RF signal, the in-phase component I and the orthogonal component Q are detected from the digital RF signal, and the phase and the frequency of the beat signal are calculated from the in-phase component I and the orthogonal component Q at the time of detecting the in-phase component I and the orthogonal component Q of the beat signal generated from the photodetector and calculating the phase and the frequency of the beat signal from the in-phase component I and the orthogonal component Q.

Advantageous Effects of Invention

With the optical measurement device and the optical measurement method according to the invention, it is possible to accurately measure a distance and a velocity even when the measurement device and an object move relatively. With the optical measurement device and the optical measurement method according to the invention, it is possible to uniquely calculate a distance and a velocity. That is, it is possible to measure a velocity without being affected by a change in distance and to measure a distance with high accuracy without being affected by a velocity. According to the invention, since FMCW LiDAR can be realized in a light wave range using laser light, it is possible to remarkably improve a spatial resolution.

With the FMCW LiDAR according to the related art, a measurable distance is limited and close measurement is not possible. However, according to the invention, it is possible to remove limitation of a measurable distance by appropriately setting a frequency shift.

With the optical measurement device and the optical measurement method according to the invention, even when a semiconductor laser that performs frequency modulation using a sinusoidal wave instead of a triangular wave, it is possible to accurately measure a velocity and a distance. According to the invention, FMCW LiDAR is constituted by a heterodyne optical system, a phase and a frequency of a beat signal are detected using the IQ detector and the arithmetic operation processor, and a velocity and a distance can be calculated from the frequency and the phase, respectively. With this configuration according to the invention, it is possible to remove a nonlinear chirp of the laser without using an additional device such as an interferometer and to accurately measure a velocity and a distance. Accordingly, an optical system for monitoring a frequency variation of the laser, an electronic circuit for controlling frequency modulation, and the like are not necessary. As a result, it is possible to remarkably simplify a device configuration and to achieve a decrease in size and a decrease in cost. Accordingly, with the optical measurement device and the optical measurement method according to the invention, it is possible to measure at least one of a distance and a velocity using a small-sized device with high accuracy.

Since a sinusoidal wave is used as a modulation signal instead of a triangular wave or a sawtooth wave, it is possible to reduce an influence on frequency response characteristics of a laser or a drive circuit and to enable a high-speed operation thereof.

When a one-channel AD converter that acquires a beat signal generated from the photodetector as a digital RF signal is provided and the functions of the IQ detector and the arithmetic operation processor are performed by an arithmetic operation processor, an influence of a nonlinear chirp can be curbed by only signal processing and thus it is possible to realize a device with a smaller size and higher accuracy.

DESCRIPTION OF EMBODIMENTS

Figure 1:
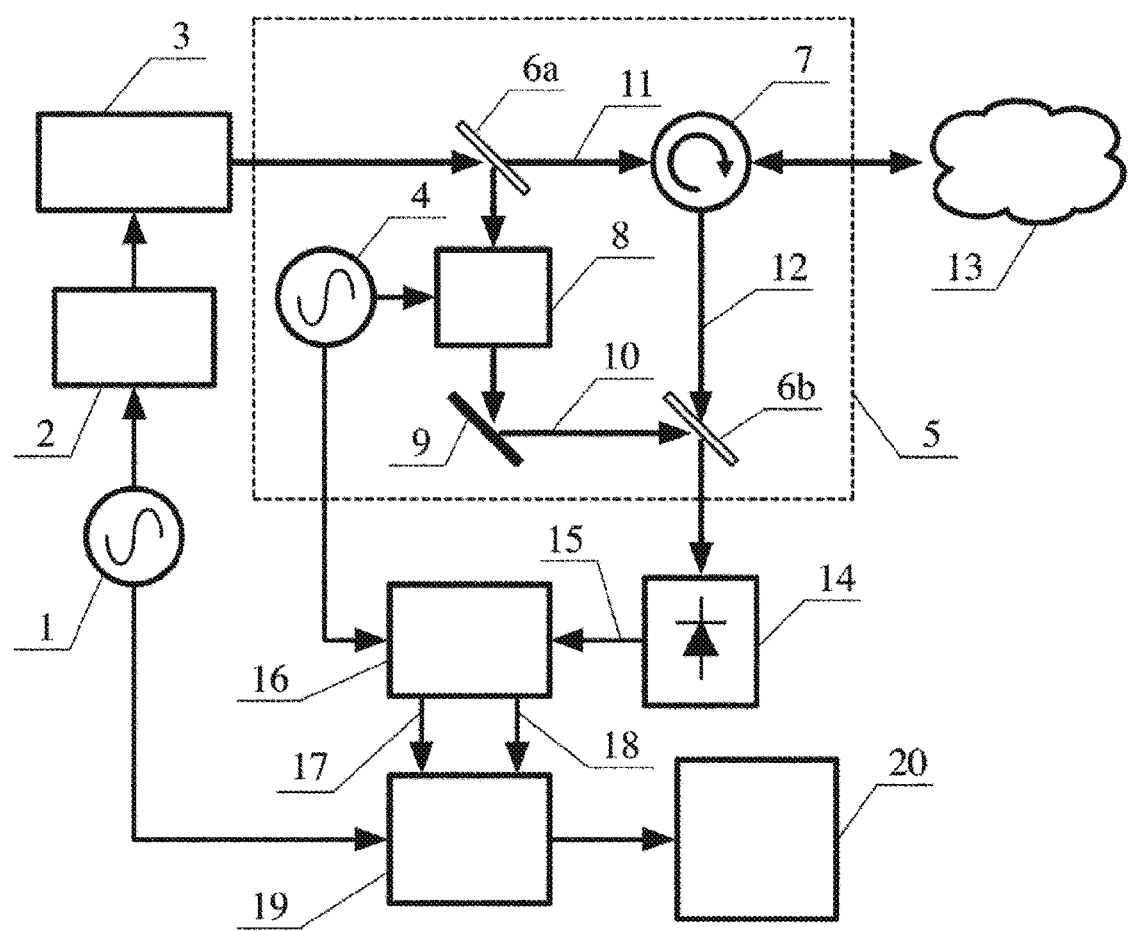
FIG. 1 is a diagram illustrating a first embodiment of an optical measurement device according to the invention.

Embodiments of the invention will be described below.

In an optical measurement method according to an embodiment of the invention, output light of a laser of which a frequency is modulated is split into two components, one is used as probe light, the other is used as reference light, a frequency shift $f_S$ is given to one of the probe light and the reference light, the probe light is applied to an object, scattered light from the object and the reference light are combined, and the combined light is incident on a photodetector, an in-phase component I and an orthogonal component Q of a beat signal generated from the photodetector are detected, a phase and a frequency of the beat signal are calculated from the in-phase component I and the orthogonal component Q, and at least one of an arithmetic operation of calculating a velocity of the object from the frequency and an arithmetic operation of calculating a distance to the object from the phase is performed.

An optical measurement device described below is used to perform the optical measurement method according to the embodiment of the invention. This optical measurement device can be used to measure only a velocity, to measure only a distance, or to measure both a velocity and a distance.

The optical measurement device according to the embodiment of the invention includes at least a laser that outputs light of which a frequency is modulated, a photodetector, a heterodyne optical system, an IQ detector, and an arithmetic operation processor. The heterodyne optical system according to this embodiment is an optical system that splits output light of the laser into two components, uses one as probe light, uses the other as reference light, adds a frequency shift $f_S$ to one of the probe light and the reference light, applies the probe light to an object, combines scattered light from the object and the reference light, and causes the combined light to be incident on the photodetector. A heterodyne interferometer is constituted by the heterodyne optical system and the object. The IQ detector detects an in-phase component I and an orthogonal component Q of a beat signal which is generated from the photodetector. The arithmetic operation processor calculates a phase and a frequency of the beat signal from the in-phase component I and the orthogonal component Q and performs at least one of an arithmetic operation of calculating a velocity of the object from the frequency and an arithmetic operation of calculating a distance to the object from the phase.

First Embodiment

A first embodiment will be described below with reference to FIG. 1. In this embodiment, a distance to an object and a velocity of the object are measured using a device including a laser that outputs light of which a frequency is modulated, a heterodyne optical system, a photodetector, an IQ demodulator that is an example of an IQ detector, a two-channel AD converter, and an IQ signal arithmetic operation processor that is an example of an arithmetic operation processor.

FIG. 1 is a diagram illustrating a basic configuration of an optical measurement device according to this embodiment. The optical measurement device illustrated in FIG. 1 includes a modulation signal generator 1, an injection current source 2, a semiconductor laser 3, a heterodyne optical system 5, a photodetector 14, an IQ demodulator 16, a two-channel AD converter 19, and an IQ signal arithmetic operation processor 20. In FIG. 1, a direct modulation semiconductor laser is illustrated as an example of the laser that outputs light of which a frequency is modulated. The heterodyne optical system 5 mainly includes a signal generator 4, a beam splitter 6a, a light circulator 7, a light frequency shifter 8, a reflector 9, and a beam splitter 6b. The light frequency shifter 8 is driven by the signal generator 4. As illustrated in FIG. 1, an output of the modulation signal generator 1 is input to the semiconductor laser 3 via the injection current source 2 and the frequency of the output light is modulated. The output light of the semiconductor laser 3 is split into two components by the beam splitter 6a, one is used as reference light 10 by causing the light frequency shifter 8 to add a frequency shift thereto, and the other is used as probe light 11. The probe light 11 is applied to an object 13 via the light circulator 7. Scattered light 12 from the object 13 is guided to the beam splitter 6b via the light circulator 7, the scattered light 12 and the reference light 10 are combined, and the combined light is received by the photodetector 14. Since a time difference based on a distance to the object 13 is generated between the reference light 10 with a modulated frequency and the scattered light 12, a frequency difference is generated. A beat signal 15 corresponding to the frequency difference is generated in an output of the photodetector 14.

The output of the photodetector 14 and the output of the signal generator 4 are input to the IQ demodulator 16, and an in-phase component 17 and an orthogonal component 18 of the beat signal 15 are detected and input to the two-channel AD converter 19. The two-channel AD converter 19 converts the in-phase component 17 and the orthogonal component 18 of the beat signal to a digital IQ signal and outputs the digital IQ signal to the IQ signal arithmetic operation processor 20. The IQ signal arithmetic operation processor 20 calculates a phase of and a frequency of the beat signal from the digital IQ signal, calculates an average value of the frequency, calculates a Doppler shift, and calculates a velocity of the object 13. Then, the IQ signal arithmetic operation processor 20 removes a component of the calculated Doppler shift from the phase and calculates an average value of an absolute value (hereinafter referred to as an absolute average phase value). The IQ signal arithmetic operation processor 20 stores a relationship between a distance and an absolute average phase value which has been calibrated in advance using the semiconductor laser 3 and calculates a distance to the object 13.

In FIG. 1, one of two components into which light is split by the beam splitter 6a is used as the probe light 11 and the other thereof is used as the reference light 10 by adding a frequency shift thereto. Since a frequency difference has only to be generated between the reference light and the probe light, the heterodyne optical system can also operate with a configuration in which the reference light and the probe light are exchanged with each other.

This configuration will be described below in detail with reference to mathematical expressions. In FIG. 1, the beat signal 15 output from the photodetector 14 can be expressed by the following expression.

[Math. 9]

$$V_{PD}(t)=I(t)\sin(2\pi f_S t)+Q(t)\cos(2\pi f_S t) \quad (9)$$

Here, $f_S$ is a frequency shift which is added by the light frequency shifter 8. I(t) and Q(t) are the in-phase component 17 and the orthogonal component 18 which are output from the IQ demodulator 16. The IQ demodulator 16 has a function of removing the component of the frequency shift $f_S$ and outputting the in-phase component 17 and the orthogonal component 18 by receiving the beat signal 15 and the output of the signal generator 4 as an input. In order for the IQ demodulator 16 to correctly demodulate the in-phase component 17 and the orthogonal component 18, the components included in I(t) and Q(t) need to be in a frequency range which is lower than the frequency shift $f_S$. Accordingly, the frequency shift $f_S$ needs to be set according to the distance and the velocity of the object 13 which are supposed. The in-phase component 17 and the orthogonal component 18 can be expressed by the following expressions.

[Math. 10]

$$I(t)=a(t)\cos \phi(t) \quad (10)$$

[Math. 11]

$$Q(t)=a(t)\sin \phi(t) \quad (11)$$

Here, a(t) represents the amplitude based on intensity modulation of the semiconductor laser 3, and φ(t) represents a phase based on frequency modulation of the semiconductor laser 3 and a Doppler shift. φ(t) can be expressed by the following expression.

[Math. 12]

$$\phi(t)=2\pi\int_0^t \{v(t')-v(t'-\tau_d)+\Delta f_D\}dt' \quad (12)$$

Here, v(t) represents the frequency modulation of the semiconductor laser 3 and $\tau_d$ represents a round-trip time of light to the object 13.

Figure 2:
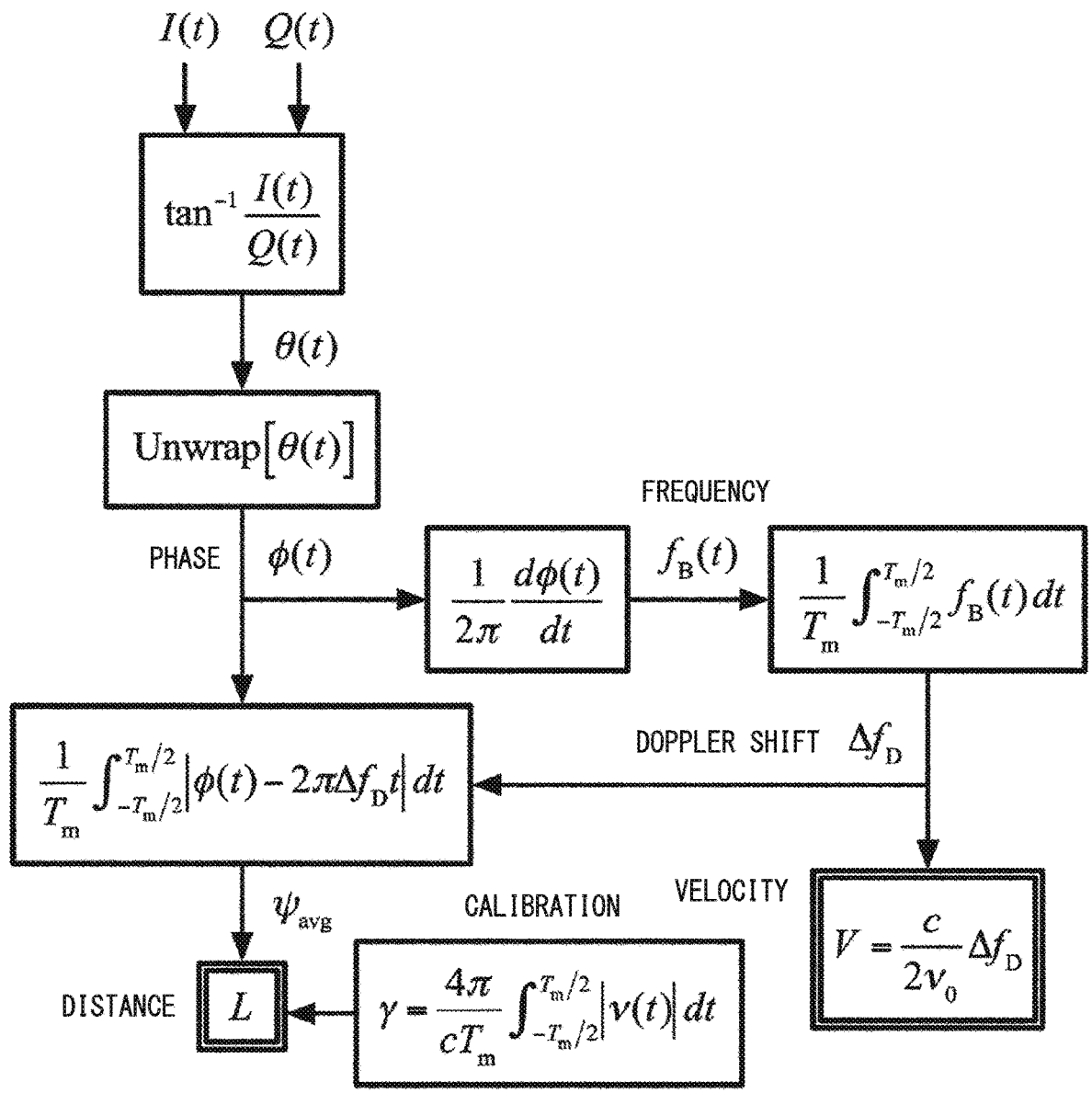
FIG. 2 is a diagram illustrating signal processing which is performed by an IQ signal arithmetic operation processor.

FIG. 2 is a diagram illustrating signal processing which is performed by the IQ signal arithmetic operation processor 20. First, a folded-back phase θ(t) is calculated from the in-phase component 17 and the orthogonal component 18 which have been converted to the digital signals using the following expression.

[Math. 13]

$$\theta(t) = \tan^{-1}\frac{Q(t)}{I(t)} \quad (13)$$

Since the arc tangent in Expression (13) calculates a value in a range from −π to +π, a phase exceeding ±π has a value obtained by subtraction of an integer multiple of ±π.

Then, the original phase φ(t) is calculated from the folded-back phase θ(t) in Expression (13) using a phase unwrapping process expressed by the following expression.

[Math. 14]

$$\phi(t_1) = \text{Unwrap}[\theta(t)] \quad (14)$$
$$= \phi(t_n) - 2\pi \sum_{k=1}^{n} \text{Int}\left[\frac{\phi(t_{k+1}) - \phi(t_k)}{\pi}\right], \{n = 1, 2, \ldots, N\}$$

Here, φ($t_k$) represents time-series data of a phase and N represents the number of pieces of data. Expression (14) represents a process of determining that folding-back of a phase occurs and adding an integer multiple of 2π when a difference between neighboring time-series data pieces is greater than π. Expression (14) is an example of the phase unwrapping process, which may be performed in the same way using another algorithm.

The frequency $f_B(t)$ of the beat signal can be calculated by time-differentiating the phase of Expression (14) and dividing the resultant by 2π.

[Math. 15]

$$f_b(t) = \frac{1}{2\pi}\frac{d\phi(t)}{dt} = v(t) - v(t - \tau_d) + \Delta f_D \quad (15)$$

An average value of one modulation period of the frequency $f_B(t)$ is given by the following expression.

[Math. 16]

$$\frac{1}{T_M}\int_{-T_m/2}^{T_m/2} f_b(t)dt = \frac{1}{T_M}\int_{-T_m/2}^{T_m/2}\{v(t) - v(t-\tau_d) + \Delta f_D\}dt = \Delta f_D \quad (16)$$

In Expression (16), since components based on the frequency modulation of the semiconductor laser 3 are AC signals, an average value thereof is zero and only $\Delta f_D$ based on the Doppler shift remains. Accordingly, the velocity of the object 13 can be calculated using the Doppler shift $\Delta f_D$ and the following expression.

[Math. 17]

$$V = \frac{c}{2v_0}\Delta f_D \quad (17)$$

In the FMCW LiDAR according to the related art, the velocity of the object 13 is calculated from the difference in beat frequency occurring in the time domain between the up and down chirps of a triangular wave. However, the optical measurement device according to this embodiment calculates the velocity from the average value of one period of the beat frequency.

A phase $\Psi(t)$ can be calculated by removing the component of the Doppler shift from an instantaneous phase in Expression (12) using the Doppler shift $\Delta f_D$ calculated by Expression (16).

[Math. 18]

$$\Psi(t)=\phi(t)-2\pi\Delta f_D t=2\pi\int_0^t\{v(t')-v(t'-\tau_d)\}dt' \quad (18)$$

When the round-trip time td of light to the object 13 is sufficiently less than the period $T_m$ of the frequency modulation of the semiconductor laser 3, an integrand function of Expression (18) can be approximated by the following expression.

[Math. 19]

$$v(t') - v(t' - \tau_d) = \tau_d\frac{v(t') - v(t' - \tau_d)}{\tau_d} \approx \tau_d\frac{dv(t')}{dt'} \quad (19)$$

The following expression is obtained by substituting Expression (19) into Expression (18).

[Math. 20]

$$\psi(t) = 2\pi\tau_d\int_0^t\frac{dv(t')}{dt'}dt' = 2\pi\tau_d v(t) \quad (20)$$

An average value of the absolute value of the phase (hereinafter referred to as an "absolute average phase value") $\Psi_{avg}$ in one modulation period regarding the phase difference $\Psi(t)$ from which the component of the Doppler shift has been removed is obtained by the following expression.

[Math. 21]

$$\psi_{avg} = \frac{1}{T_m}\int_{-T_m/2}^{T_m/2}|\psi(t)|dt = \frac{4\pi L}{cT_m}\int_{-T_m/2}^{T_m/2}|v(t)|dt \quad (21)$$

Here, v(t) in the integrand function represents presents the frequency modulation of the semiconductor laser 3 and an integral value thereof is an integer which does not depend on the distance or the velocity of the object 13. Accordingly, since the absolute average phase value $\Psi_{avg}$ is proportional to the distance L to the object 13, the distance L can be calculated by acquiring a proportional coefficient $\gamma$ expressed by the following expression in advance. The distance L is given as [absolute average phase value $\Psi_{avg}$]/[proportional coefficient $\gamma$]. Accordingly, after the component of the Doppler shift has been excluded from the phase, the average value of the absolute values [absolute average phase value $\Psi_{avg}$] can be calculated, and the distance L to the object can be calculated on the basis of a proportional relationship (the proportional coefficient $\gamma$) between a distance and the average value of the absolute values of the phase which has been calibrated in advance.

[Math. 22]

$$\gamma = \frac{4\pi}{cT_m}\int_{-T_m/2}^{T_m/2}|v(t)|dt \quad (22)$$

The proportional coefficient $\gamma$ is stored in advance in the IQ signal arithmetic operation processor 20 and a beat signal arithmetic operation processor 22. The proportional coefficient $\gamma$ can be calculated from the frequency modulation v(t) of the semiconductor laser 3, the modulation period $T_m$, and the speed of light c. The proportional coefficient may be calculated by measuring a relationship between the absolute average phase value $\Psi_{avg}$ and an optical path difference using an interferometer of which the optical path difference has been calibrated.

In order to allow the IQ demodulator 16, the IQ signal arithmetic operation processor 20, and the beat signal arithmetic operation processor 22 to operate appropriately, the frequency shift $f_S$ needs to be set according to the distance and the velocity of the object 13. When a sum of the frequency of the beat signal expressed by Expression (15) and the frequency shift $f_S$ is in a negative range, the frequency shift $f_S$ is detected as a positive frequency and thus an error is caused in calculating the distance and the velocity. Accordingly, the frequency shift $f_S$ needs to be set to be greater than the absolute value of the frequency of the beat signal in Expression (15). In the FMCW LiDAR according to the related art, a measurable distance is limited depending on a movement velocity of the object 13. However, in an optical distance and velocity detecting device according to the invention, the measurable distance is not limited by appropriately setting the frequency shift $f_S$.

In the FMCW LiDAR according to the related art, a triangular wave or a sawtooth wave is used as a frequency modulation signal. On the other hand, in this embodiment, an arbitrary periodic function signal can be used without being limited to a triangular wave or a sawtooth wave by acquiring the proportional coefficient $\gamma$ in advance. Expression (21) represents an average value in one modulation period, but a section in which the average value is calculated may be set to an integer multiple of the modulation period.

Second Embodiment

Figure 3:
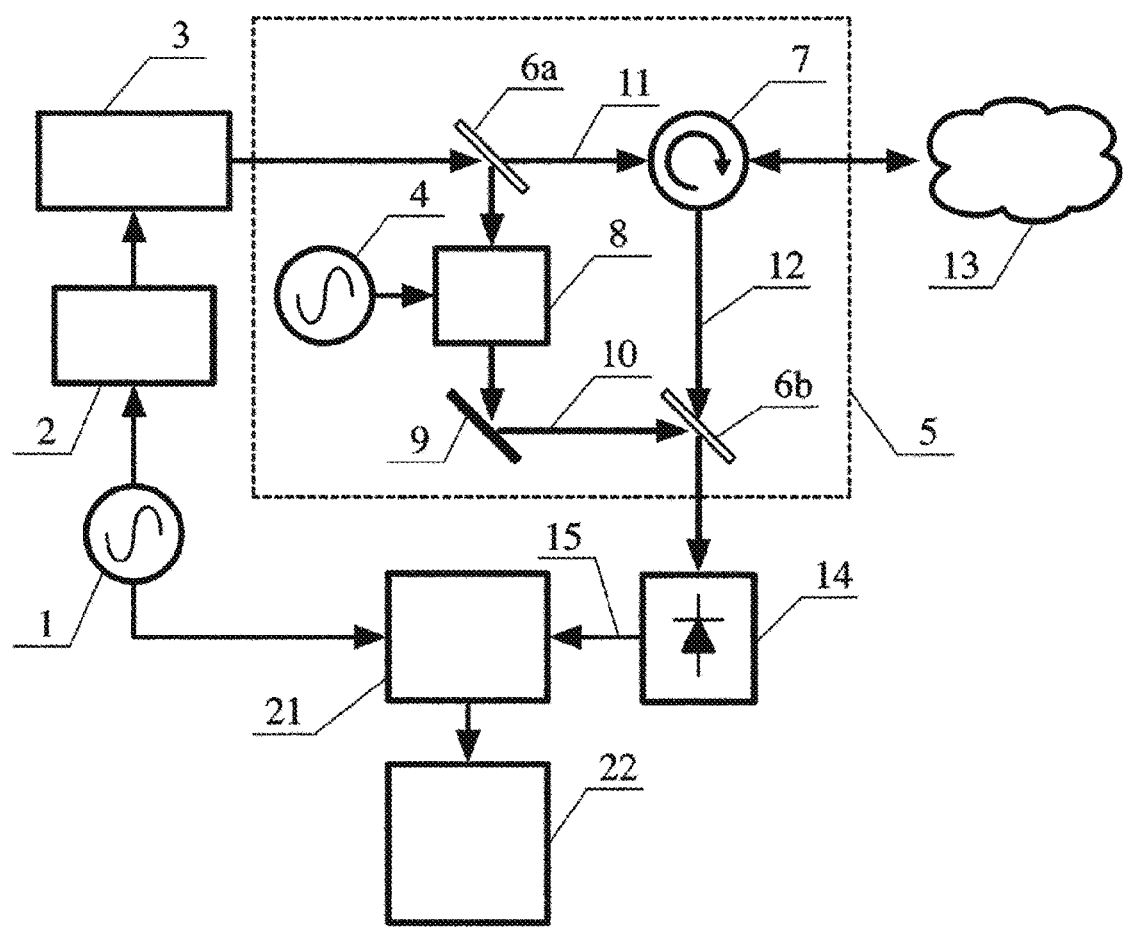
FIG. 3 is a diagram illustrating a second embodiment of the optical measurement device according to the invention.

A second embodiment will be described below with reference to FIG. 3. FIG. 3 is a diagram illustrating a basic configuration of an optical measurement device according to this embodiment. In this embodiment, a one-channel AD converter 21 and a beat signal arithmetic operation processor 22 are used instead of the IQ demodulator 16, the two-channel AD converter 19, and the IQ signal arithmetic operation processor 20. The output of the photodetector 14 is input to the one-channel AD converter 21 and is input as a digital RF signal to the beat signal arithmetic operation processor 22. The beat signal arithmetic operation processor 22 calculates an in-phase component and an orthogonal component of the beat signal from the digital RF signal and calculates a phase and a frequency of the beat signal. A process of calculating a velocity and a distance of an object from the phase and the frequency is the same as in the IQ signal arithmetic operation processor 20. Here, the beat signal arithmetic operation processor performs the functions of both an IQ detector that detects an in-phase component I and an orthogonal component Q from the digital RF signal and an arithmetic operation processor that calculates the phase and the frequency of the beat signal from the in-phase component I and the orthogonal component Q and calculates the velocity and the distance of the object.

[Evaluation of Accuracy]

Figure 4:
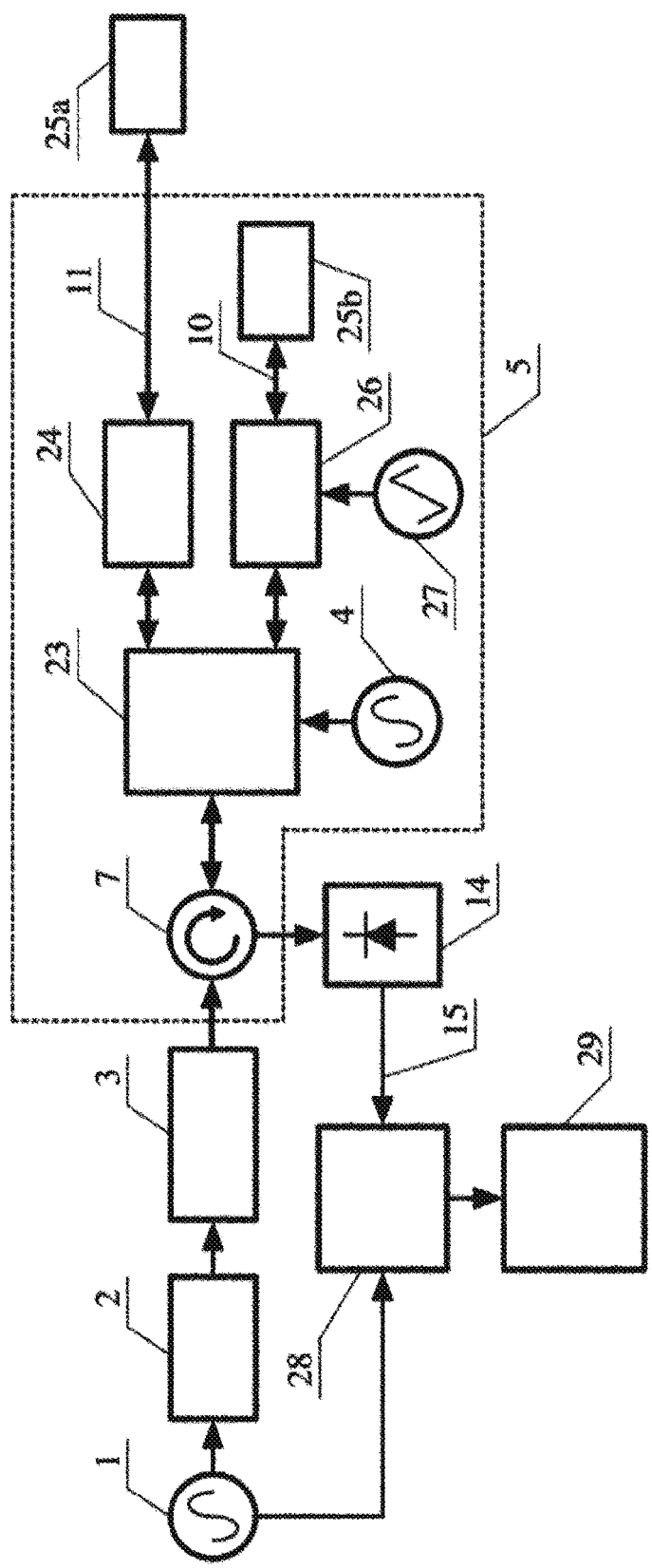
FIG. 4 is a diagram illustrating a device for evaluating measurement accuracy of the optical measurement device according to the invention.

FIG. 4 is a diagram illustrating a device that evaluates measurement accuracy of the optical measurement device according to the invention. The accuracy evaluation device illustrated in FIG. 4 includes a modulation signal generator 1, an injection current source 2, a semiconductor laser 3, a heterodyne optical system 5, a photodetector 14, a vector signal analyzer 28, and an arithmetic operation processor 29. An output of the modulation signal generator 1 is input to the semiconductor laser 3 via the injection current source 2 and the frequency of output light is modulated. The output light of the semiconductor laser 3 is input to the heterodyne optical system 5 via the light circulator 7.

The heterodyne optical system 5 includes optical fiber and includes the light circulator 7, an acousto-optic modulator 23, a signal generator 4, a variable optical delay line 24, a light phase shifter 26, a triangular wave signal generator 27, and a Faraday rotating mirror 25b. The heterodyne optical system 5 constitutes a heterodyne interferometer along with a Faraday rotating mirror 25a corresponding to the object 13 (see FIG. 1 or 3). The optical measurement device illustrated in FIGS. 1 and 3 is a Mach-Zehnder interferometer, but a polarization-independent Michelson interferometer is used to remove an influence of polarization plane rotation on light propagating in the optical fiber herein.

In the heterodyne optical system 5, the acousto-optic modulator 23 has the function of the beam splitters 6a and 6b and the light frequency shifter 8 in FIG. 1 or 3. The acousto-optic modulator 23 is driven by the signal generator 4 and outputs zeroth-order diffracted light not subjected to a light frequency shift and first-order diffracted light subjected to a light frequency shift. Here, the zeroth-order diffracted light is used as probe light 11 and the first-order diffracted light is used as reference light 10. The zero-th order diffracted light is transmitted by the variable optical delay line 24, is reflected by the Faraday rotating mirror 25a, propagates in the same optical path reversely, and is input to the photodetector 14 via the light circulator 7. In order to apply a change in distance to the probe light 11, an optical path length is precisely adjusted using the variable optical delay line 24. The probe light 11 arriving at the photodetector 14 is transmitted two times by the acousto-optic modulator 23, but a frequency shift does not occur.

On the other hand, the first-order diffracted light is transmitted by the light phase shifter 26, is reflected by the Faraday rotating mirror 25b, propagates in the same optical path reversely, and is input to the photodetector 14 via the light circulator 7. In order to simulate movement, the optical path length is modulated using the light phase shifter 26 and a Doppler shift is applied to the reference light 10. Since the light phase shifter 26 is driven by the triangular wave signal generator 27, both positive and negative movement velocities can be simulated. Since the reference light 10 arriving at the photodetector 14 is transmitted two times by the acousto-optic modulator 23, a frequency shift corresponding to two times the frequency of the signal generator 4 is applied thereto.

In FIG. 4, distance variation is applied to the probe light 11 and a Doppler shift based on movement is applied to the reference light 10. This configuration corresponds to a case in which the measurement device which is an observer moves and the distance to the object 13 changes in the optical measurement device illustrated in FIG. 1 or 3. Since a relative velocity between the measurement device and the object is measured in calculating the velocity based on the Doppler shift, the measurement result does not change even when the Doppler shift is applied to any one of the reference light and the probe light.

The reference light 10 and the probe light 11 input to the photodetector 14 cause a beat signal 15 based on heterodyne interference to be output. The center frequency of the beat signal is double the frequency of the signal generator 4. The beat signal output from the photodetector 14 is input to the vector signal analyzer 28, and the vector signal analyzer 28 performs conversion to a digital signal (a resolution of 12 bits), detection of an in-phase component and an orthogonal component expressed by Expressions (10) and (11), calculation of a folded-back phase expressed by Expression (13), and a phase unwrapping process expressed by Expression (14) and calculates the original phase. Here, the processes from Expression (15) to Expression (22) are performed off-line using the arithmetic operation processor 29. Here, the beat signal is processed using the configuration illustrated in FIG. 3, but actual measurement of a distance or a velocity can be performed faster using the IQ demodulator which is an analog electronic circuit with the configuration illustrated in FIG. 1.

Specific evaluation examples of evaluation results of measurement accuracy will be described below. When a sinusoidal wave of a frequency of 50 kHz is used as the output of the modulation signal generator 1, the amplitude of a modulation current of the semiconductor laser 3 is 76 $mA_{pp}$ and the chirp bandwidth of output light is 14.7 GHz. Since the semiconductor laser 3 performs modulation into a sinusoidal wave, the output light has a nonlinear chirp and cannot calculate a distance and a velocity using Expressions (1), (2), and (3) in the related art. The frequency of the signal generator 4 is 100 MHz and the center frequency of the beat signal 15 is 200 MHz. The frequency of the triangular wave signal generator 27 that drives the light phase shifter 26 is 1 kHz and is synchronized with the modulation signal generator 1. Since acquisition of a beat signal by the vector signal analyzer 28 is synchronized with the triangular wave signal generator 27, it is possible to acquire waveforms corresponding to positive and negative velocities by adjusting a trigger delay in acquisition of a beat signal.

In Evaluation Example 1, under the conditions of a constant distance that the variable optical delay line 24 is fixed, a variation in velocity was given by the modulation amplitude of the light phase shifter 26 and the velocity and the absolute average phase value were measured.

Figure 5A:
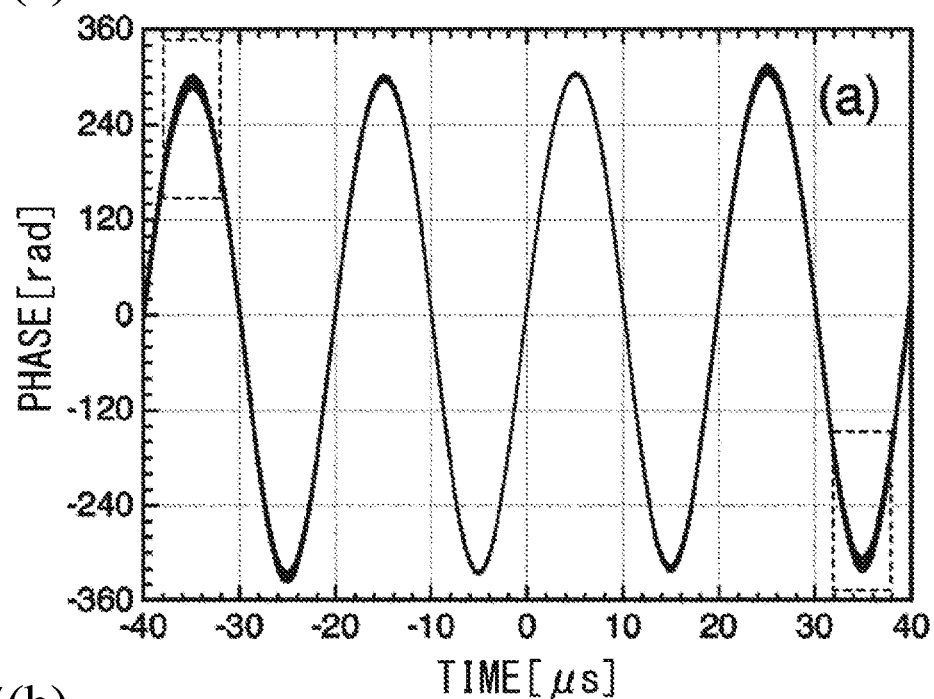
FIGS. 5 (a)-5 (b) are diagrams illustrating a beat signal phase when a positive velocity is added by a light phase shifter according to Evaluation Example 1, where FIG. 5 (b) is an enlarged view of a part (a part surrounded by a dotted line) in FIG. 5 (a).
Figure 5B:
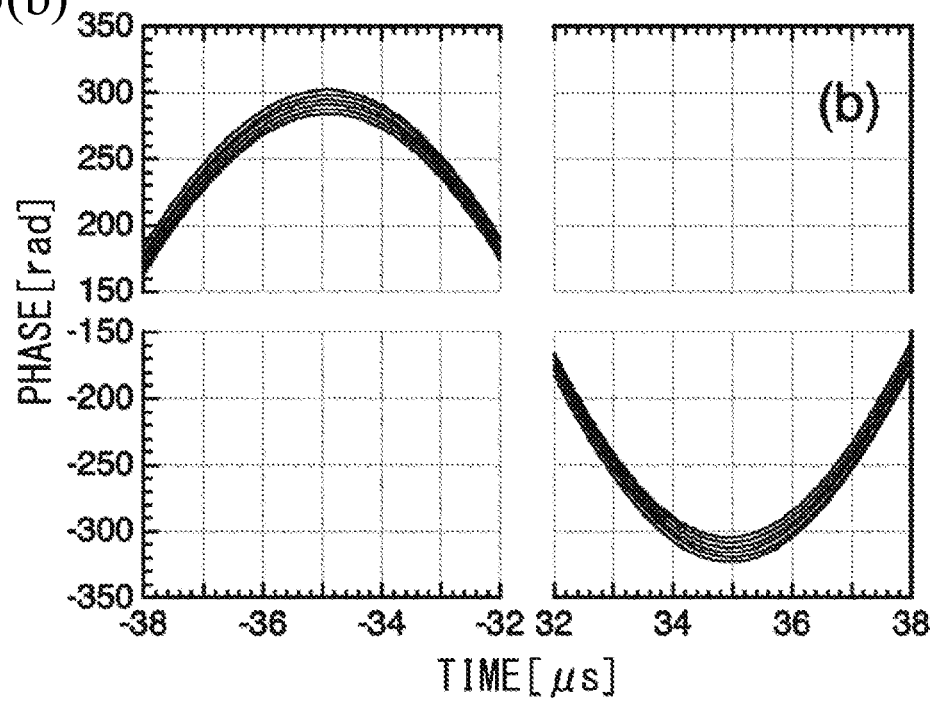

FIGS. 5 (a)-5 (b) are diagrams illustrating a waveform of a beat signal phase when a positive velocity is given by the light phase shifter 26. FIG. 5 (b) is an enlarged view of a part (a part surrounded by a dotted line) in FIG. 5 (a). FIG. 5 (a) illustrates a waveform when the modulation amplitude of the light phase shifter 26 changes from 0 V to 150 Vpp in units of 30 V. It can be seen that the whole waveform increased obliquely upward and rightward with an increase in velocity. This slope corresponds to the Doppler shift in Expression (12). In the enlarged view of FIG. 5 (b), a change of the phase with respect to the velocity is clearly illustrated.

Figure 6A:
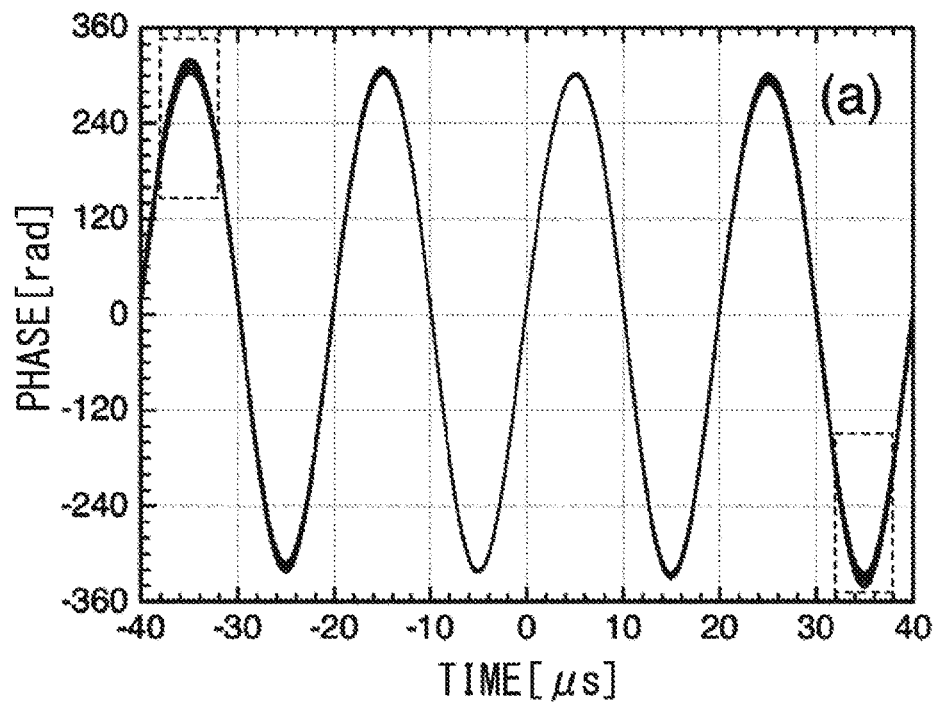
FIGS. 6 (a)-6 (b) are diagrams illustrating a beat signal phase when a negative velocity is given by the light phase shifter according to Evaluation Example 1, where FIG. 6 (b) is an enlarged view of a part (a part surrounded by a dotted line) in FIG. 6 (a).
Figure 6B:
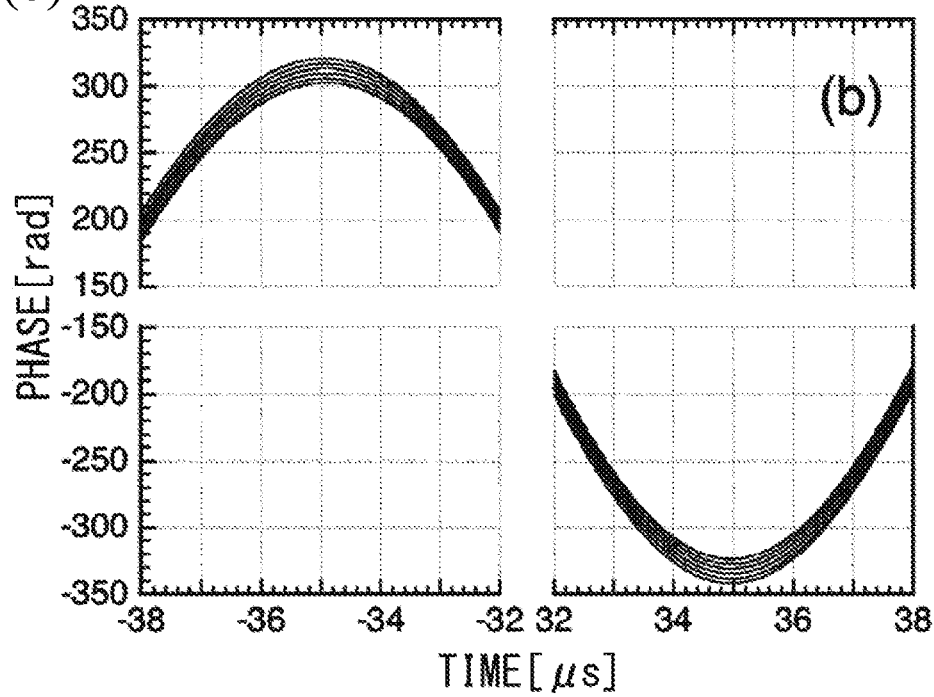

FIGS. 6 (a)-6 (b) are diagrams illustrating a waveform of a beat signal phase when a negative velocity is given by the light phase shifter 26. FIG. 6 (b) is an enlarged view of a part (a part surrounded by a dotted line) in FIG. 6 (a). In comparison with FIGS. 5 (a)-5 (b), it can be seen that the slope of the whole waveform is reverse and a movement direction is reverse.

Figure 7:
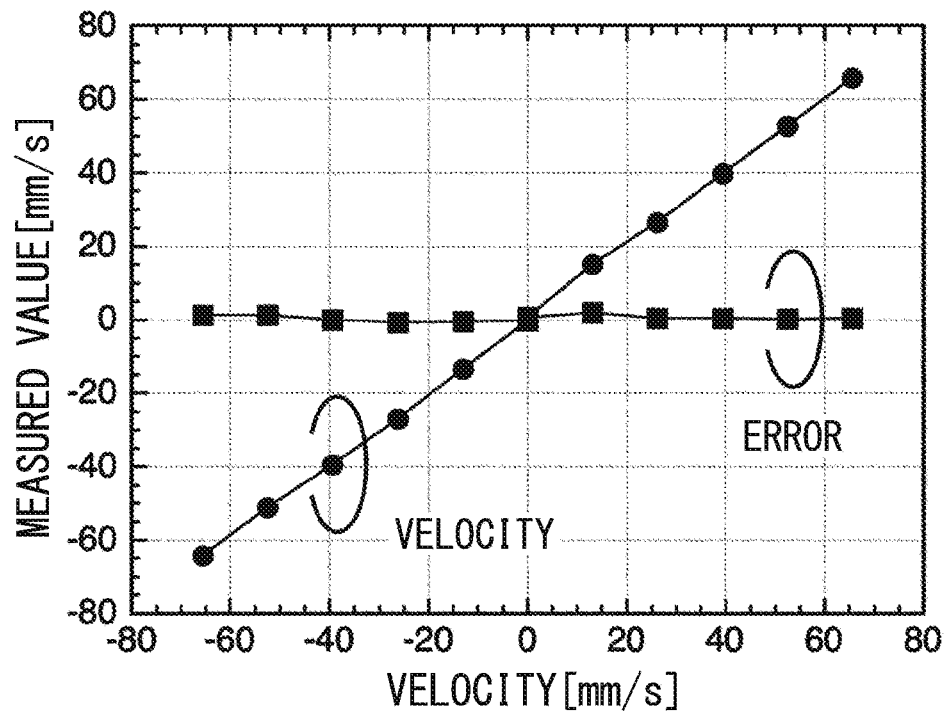
FIG. 7 is a diagram illustrating a velocity calculation result and an error according to Evaluation Example 1.

The velocity can be calculated from the phase of the beat signal illustrated in FIGS. 5 and 6 using Expressions (15), (16), and (17). FIG. 7 is a diagram illustrating a calculated velocity and an error for a waveform corresponding to one period from −10 μs to +10 μs. Black circular marks indicate the calculation result of the velocity, and black rectangular marks indicate the calculation results of the error. The horizontal axis represents a value which is obtained by incorporating the light phase shifter 26 into the heterodyne interferometer described in Non Patent Literature 1, measuring a phase-modulated waveform, converting the phase to a distance, and correcting the velocity. The measured value matches a calibrated value well and the error is equal to or less than ±2 mm/s. The heterodyne interferometer described in Non Patent Literature 1 is constituted by a Mach-Zehnder interferometer including a light frequency shifter and has a function of measuring a phase-modulated waveform from the beat signal.

Figure 8:
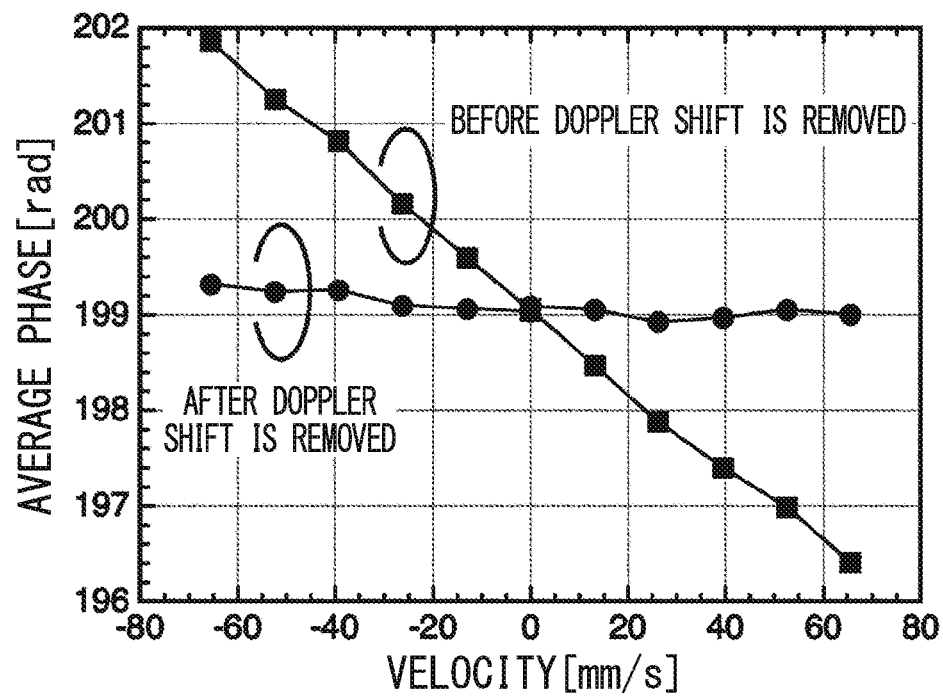
FIG. 8 is a diagram illustrating a calculation result of an absolute average phase value before and after a Doppler shift is removed according to Evaluation Example 1.

The Doppler shift can be removed from the phase of the beat signal illustrated in FIGS. 5 and 6 using Expression (18) and the absolute average phase value can be calculated additionally using Expression (21). FIG. 8 is a diagram illustrating the absolute average phase value calculated from a waveform corresponding to one period from −10 μs to +10 μs. Black rectangular marks indicate the calculation result of the absolute average phase value before the Doppler shift is removed, and black circular marks indicate the calculation result of the absolute average phase value after the Doppler shift has been removed. That is, the average value which should be constant when it is calculated from a waveform from which the Doppler shift has not been removed decreases in proportion to the velocity. On the other hand, a value calculated from a waveform after the Doppler shift has been removed is almost constant. FIG. 8 represents that calculation of the absolute average phase value is greatly affected by a low velocity equal to or less than 100 mm/s.

In Evaluation Example 2, under the conditions of a constant velocity, the distance and the velocity were measured while changing the distance using the variable optical delay line 24.

FIGS. 9 (a)-9c) are diagrams illustrating a beat signal phase when a distance is changed in the units of 4 mm using the variable optical delay line 24. FIGS. 9 (a), 9 (b), and 9 (c) correspond to −52.4 mm/s, 0 mm/s, and 52.5 mm/s, respectively. It can be seen that the whole waveform in FIGS. 9 (a) and 9 (c) is inclined upward and rightward (see FIG. 9 (a)) or downward and rightward (see FIG. 9 (c)) according to the sign of the velocity relative to the waveform at the time of stop in FIG. 9 (b).

Figure 9A:
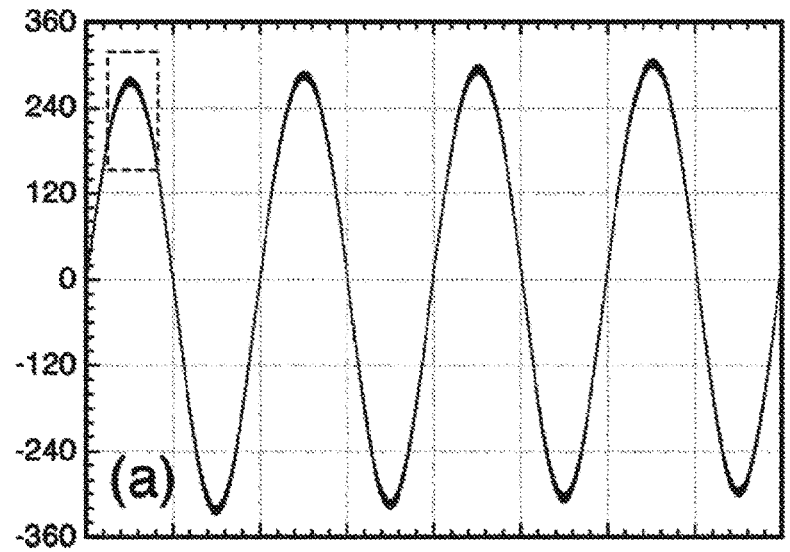
FIGS. 9 (a)-9 (c) are diagrams illustrating a beat signal phase when a distance is changed by a variable optical delay line according to Evaluation Example 2.
Figure 9B:
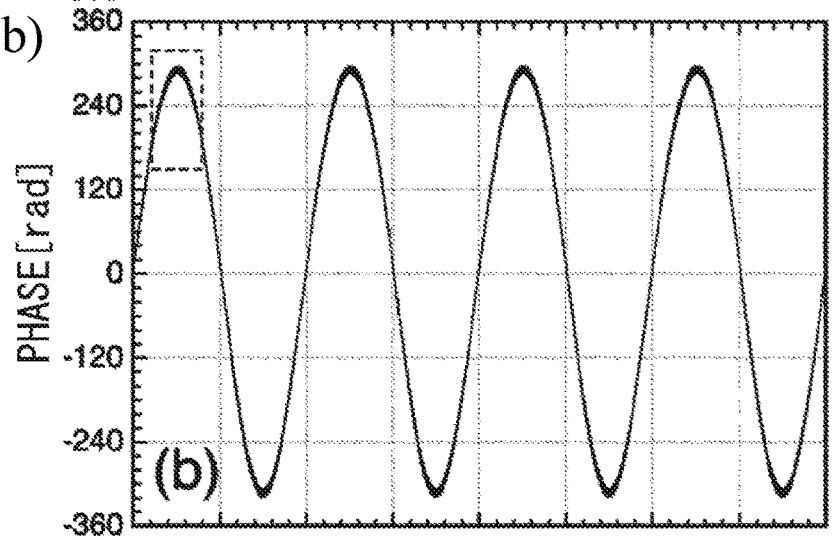
Figure 9C:
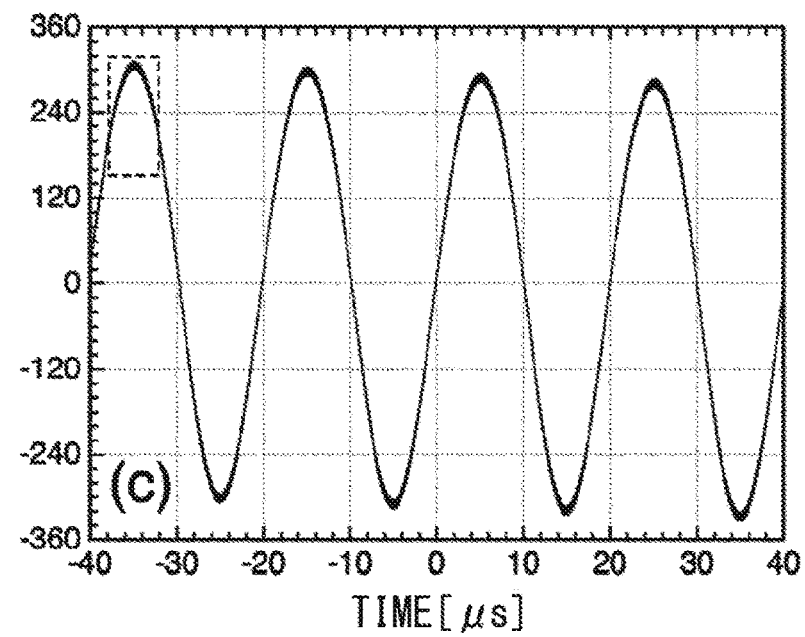
Figure 10A:
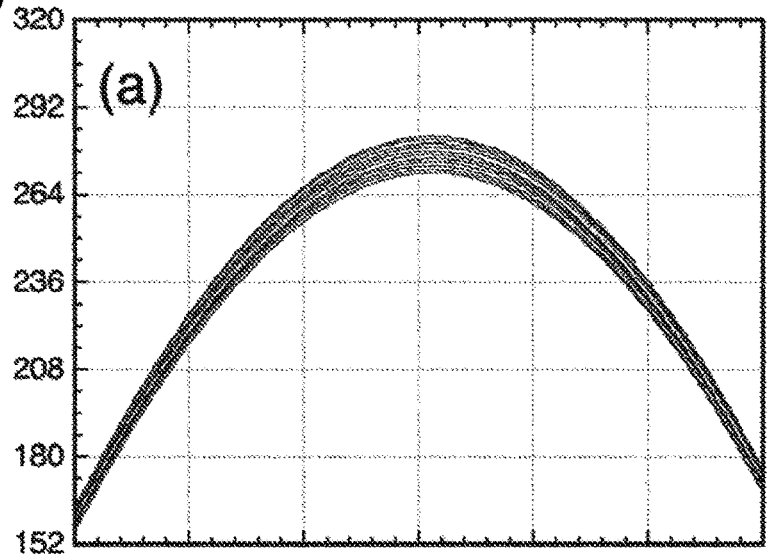
FIGS. 10 (a)-10 (c) are diagrams illustrating a beat signal phase when a distance is changed by a variable optical delay line according to Evaluation Example 2, where FIGS. 10 (a), 10 (b), and 10 (c) are enlarged views of parts (parts surrounded by dotted lines) in FIGS. 9 (a), 9 (b), and 9 (c).
Figure 10B:
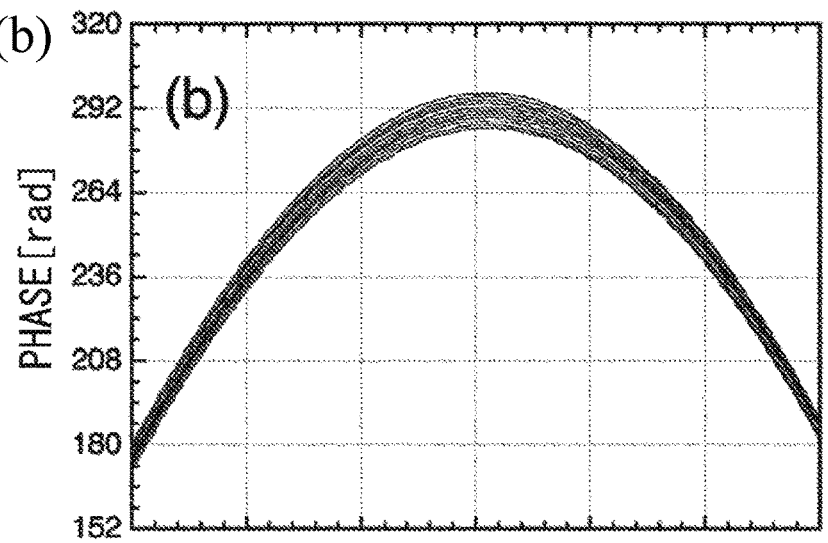
Figure 10C:
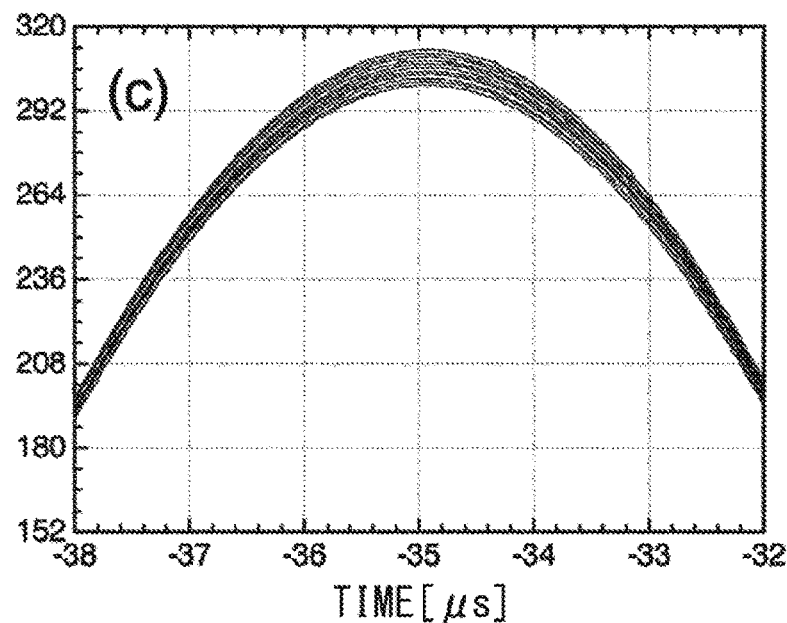

FIGS. 10 (a)-10 (c) are enlarged views of a part (a part surrounded by a dotted line) in FIG. 9 FIGS. 9 (a)-9 (c). FIGS. 10 (a), 10 (b), and 10 (c) correspond to −52.4 mm/s, 0 mm/s, and 52.5 mm/s, respectively. A change in phase due to the change in distance in the units of 4 mm can be apparently seen. It can be seen that the whole waveform in FIGS. 10 (a) and 10 (c) is shifted upward and downward according to the sign of the velocity relative to the waveform at the time of stop in FIG. 10 (b).

Figure 11:
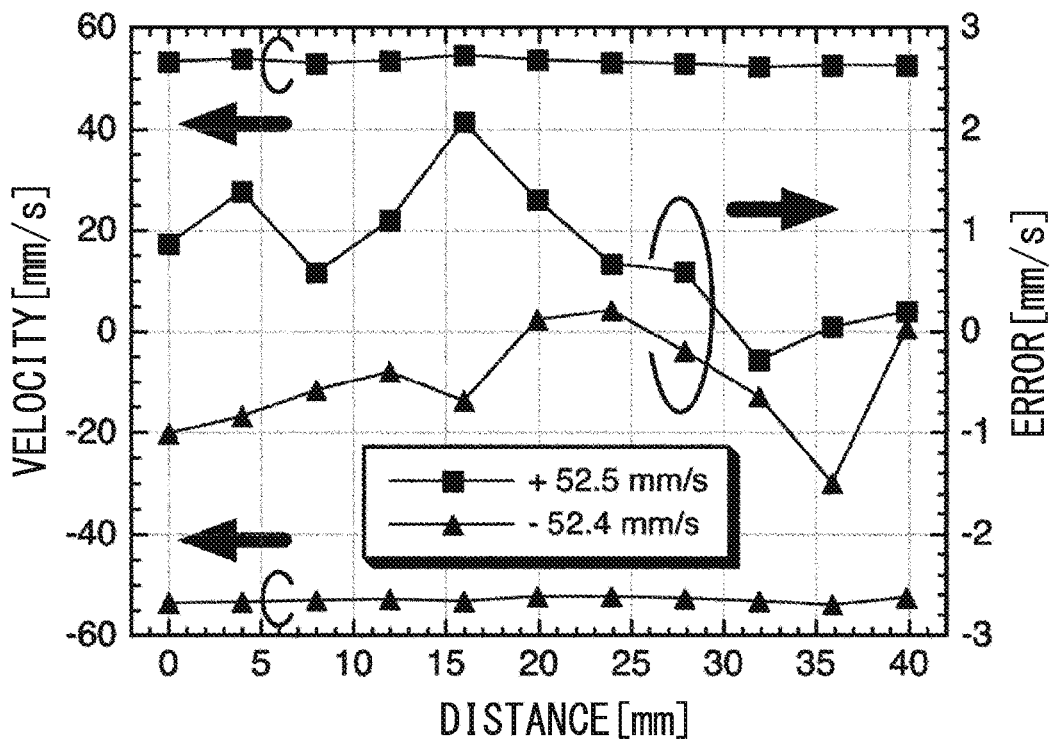
FIG. 11 is a diagram illustrating a calculated velocity and an error according to Evaluation Example 2.

First, the velocity was calculated using the waveform in one period from −10 μs to +10 μs out of the beat signal phase illustrated in FIGS. 9(a) and 9(c) and Expressions (16) and (17). FIG. 11 is a diagram illustrating the calculated velocity and an error. Black triangular marks correspond to the velocity of −52.4 mm/s and black rectangular marks correspond to +52.5 mm/s. The measured value of the velocity is almost constant regardless of the distance, and the error is about ±2 mm/s. The result illustrated in FIG. 11 represents that the velocity can be measured without being affected by the change in distance.

Figure 12:
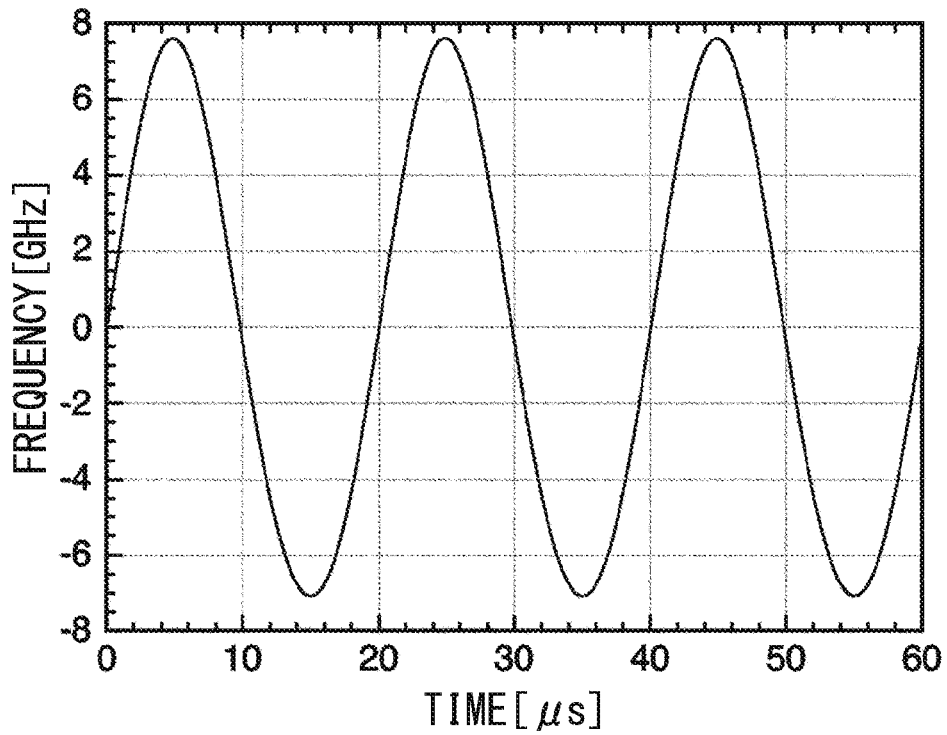
FIG. 12 is a diagram illustrating a frequency modulation waveform of a semiconductor laser according to Evaluation Example 2.

Then, the distance was calculated using the waveform in one period from −10 μs to +10 μs out of the beat signal phase illustrated in FIGS. 9(a), 9(b), and 9(c) and Expressions (20) to (22). The proportional coefficient γ in Expression (2) was calculated from the frequency modulation of the semiconductor laser 3. FIG. 12 is a diagram illustrating frequency modulation waveform of the semiconductor laser 3 which was measured using a heterodyne interferometer described in Non Patent Literature 1. The proportional coefficient calculated from the waveform illustrated in FIG. 12 is γ=196.1 [rad/m]. The heterodyne interferometer described in Non Patent Literature 1 is constituted by a Mach-Zehnder interferometer including a light frequency shifter and has a function of measuring a frequency-modulated waveform from a beat signal.

Figure 13A:
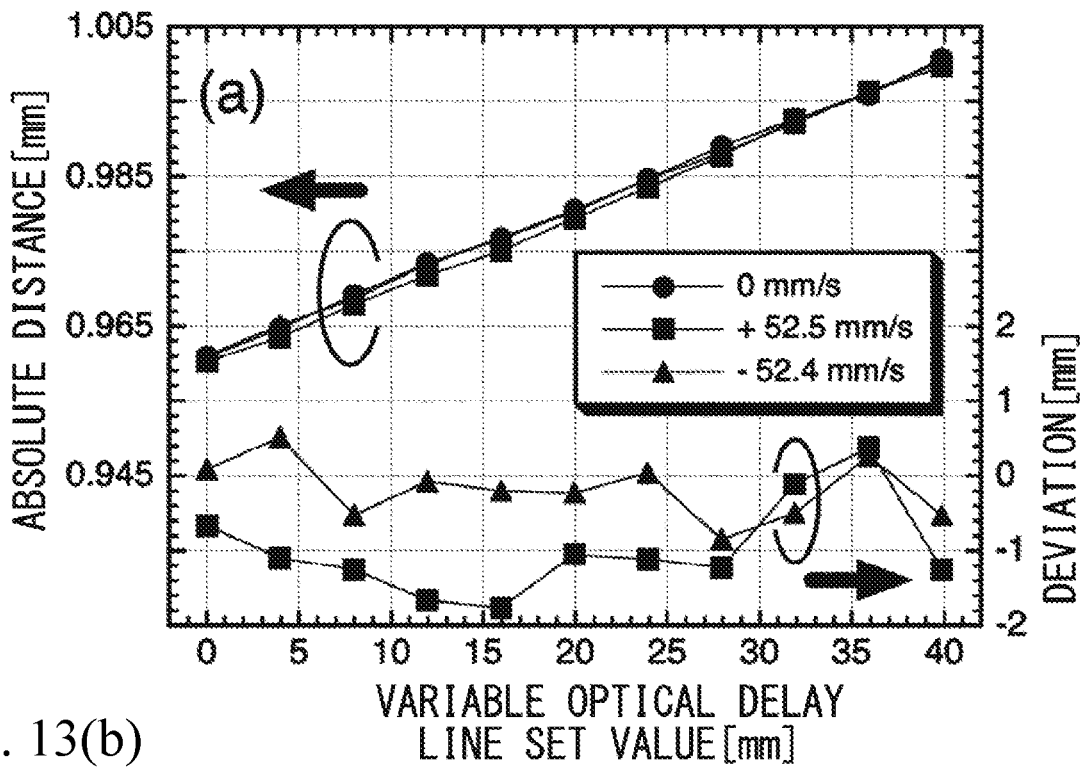
FIGS. 13 (a)-13 (b) are diagrams illustrating a calculated distance according to Evaluation Example 2, where FIG. 13 (a) illustrates an absolute distance and a difference from a velocity 0 and FIG. 13 (b) illustrates a relative distance and an error.
Figure 13B:
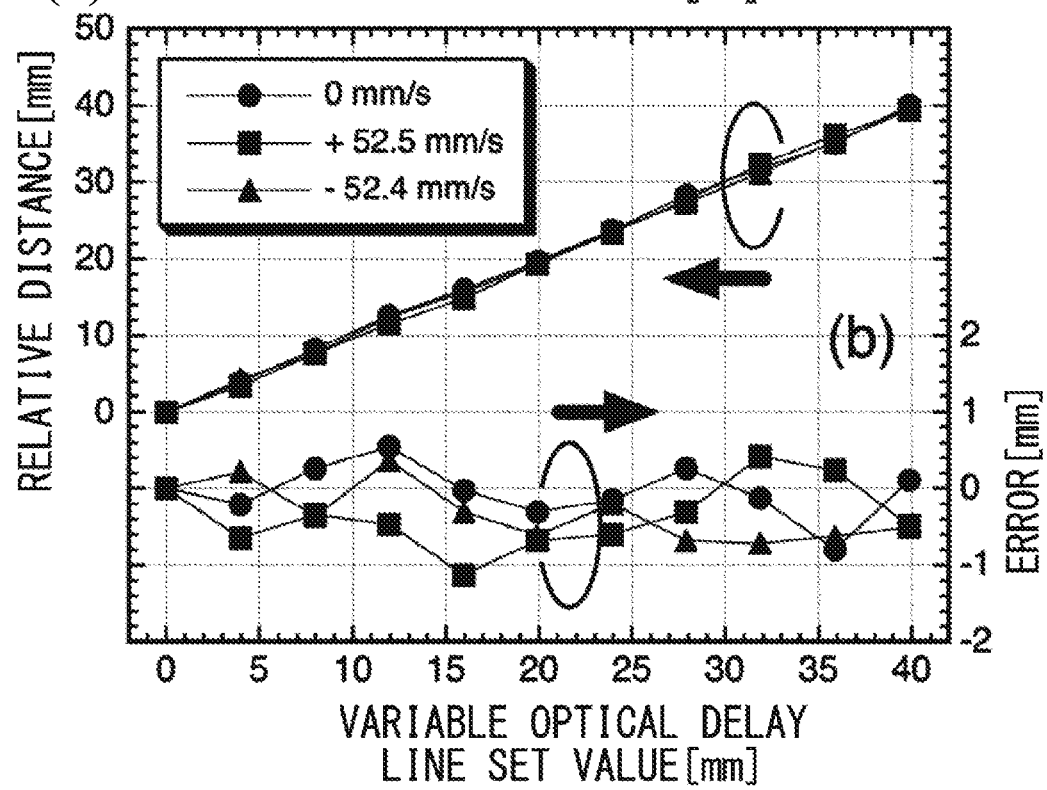
Figure 14A:
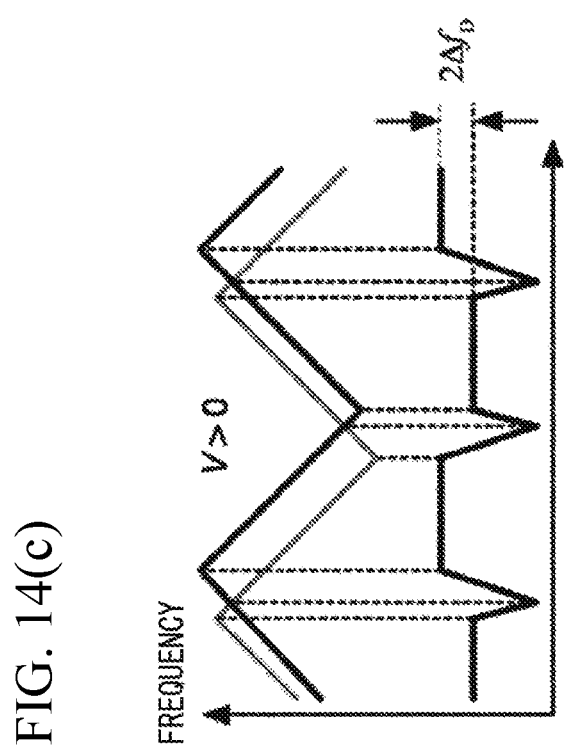
FIG. 14 is a diagram-FIGS. 14 (a)-14 (d) are diagrams illustrating the principle of FMCW LiDAR according to the related art, where FIG. 14 (a) illustrates FMCW LiDAR, FIG. 14 (b) illustrates frequencies of reference light, scattered light, and a beast signal when an object stops, and FIGS. 14 (c) and 14 (d) illustrate frequencies of reference light, scattered light, and a beast signal when an object moves.
Figure 14C:
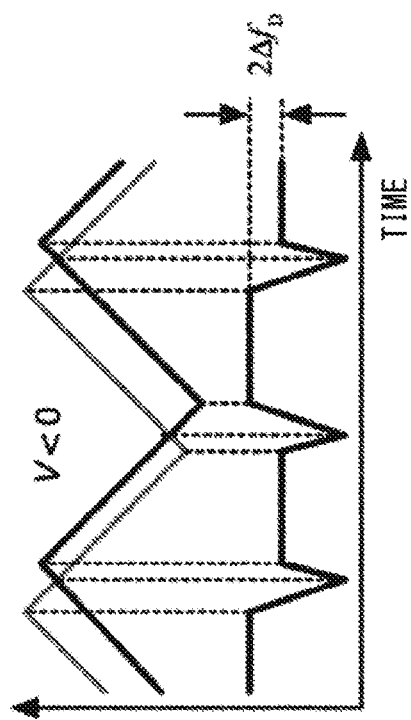
Figure 14B:
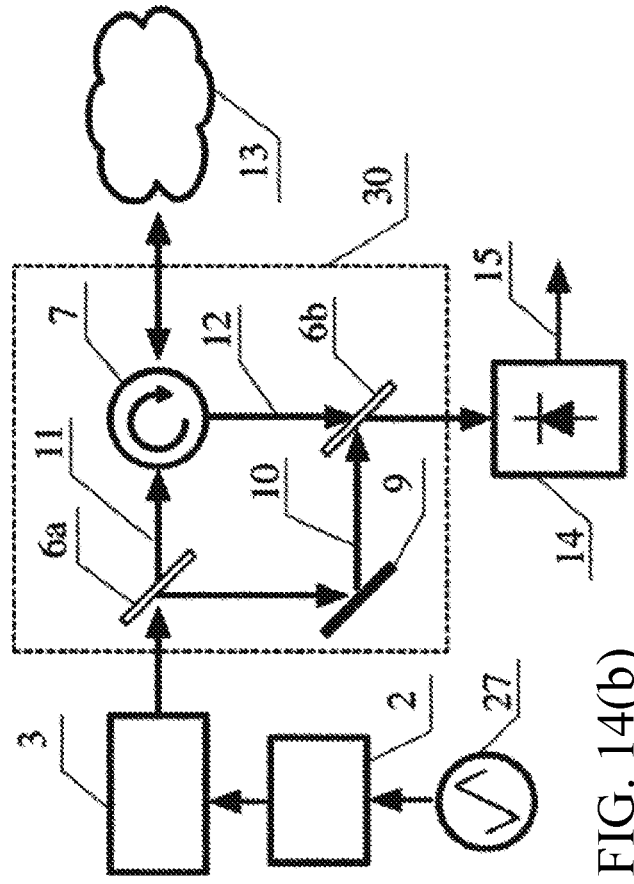
Figure 14D:
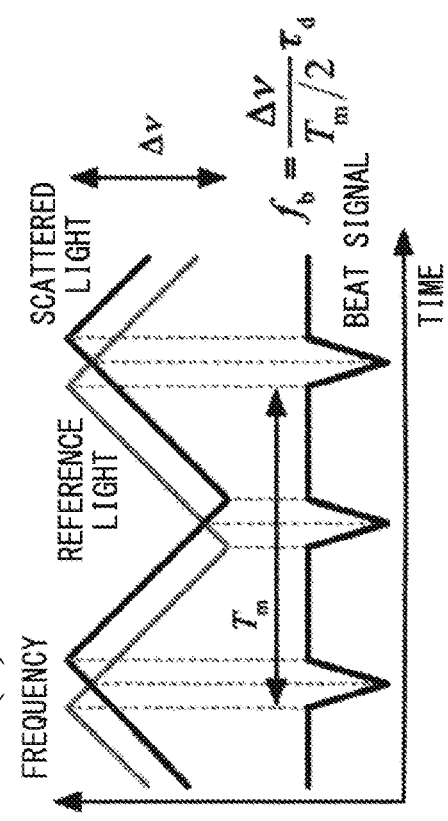

FIGS. 13 (a)-13 (b) are diagrams illustrating the calculated distance. Black circular marks correspond to the velocity of 0 mm/s, black rectangular marks correspond to the velocity of +52.5 mm/s, and black triangular marks correspond to the velocity of −52.4 mm/s. FIG. 13 (a) illustrates an absolute distance and a difference from the velocity of 0 mm/s. The absolute distance is proportional to a set value of the variable optical delay line and the deviation of the measured distance value due to the velocity is about ±2 mm. FIG. 13 (b) illustrates a relative distance and an error from the set value of the variable optical delay line. At any velocity, the relative error is about ±1 mm, which represents that a distance can be accurately measured without being affected by the velocity.

The chirp bandwidth of the semiconductor laser 3 is 14.7 GHz, and the resolution calculated using Expression (8) in the related art is 1 cm. On the other hand, in Evaluation Examples 1 and 2, although there was a nonlinear chirp, the acquired accuracy and resolution were about several mm which is more excellent than 1 cm. This difference in performance is because the number of scattering points is one and the signal processing is performed in the time domain. In the related art, since the signal processing is performed in the frequency domain, the spectrum of the beat signal is broadened due to the nonlinear chirp and it is difficult to accurately calculate the center. On the other hand, in the optical measurement device and method according to the invention, since the signal processing is performed in the time domain and variations of a signal based the distance and the velocity can be clearly distinguished, it is possible to achieve high-precision measurement.

In the aforementioned embodiments, the semiconductor laser is used as a light source, but a laser having a frequency modulation function or a light source in which a laser with a fixed frequency and a frequency modulator are combined can be used in the same way.

The examples described in the aforementioned embodiments or the like are provided for easy understanding of the invention and the invention is not limited to the examples.

INDUSTRIAL APPLICABILITY

Since an additional device for controlling frequency modulation of a laser is not necessary, the optical measurement device and method according to the invention is industrially applicable as an FMCW LiDAR system with a small size, high accuracy, and a low cost. The optical measurement device and method are applicable to consumer products such as an environment recognition sensor of a vehicle, an autonomous robot, or the like.

REFERENCE SIGNS LIST

1 Modulation signal generator
2 Injection current source
3 Semiconductor laser
4 Signal generator
5 Heterodyne optical system
6a, 6b Beam splitter
7 Light circulator
8 Light frequency shifter
9 Reflector
10 Reference light
11 Probe light
12 Scattered light
13 Object
14 Photodetector
15 Beat signal
16 IQ demodulator
17 In-phase component
18 Orthogonal component
19 Two-channel AD converter
20 IQ signal arithmetic operation processor
21 One-channel AD converter
22 Beat signal arithmetic operation processor
23 Acousto-optic modulator
24 Variable optical delay line
25a, 25b Faraday rotating mirror
26 Light phase shifter
27 Triangular wave signal generator
28 Vector signal analyzer
29 Arithmetic operation processor
30 Homodyne optical system

The invention claimed is:

1. An optical measurement device comprising:
a laser that outputs light of which a first frequency is modulated;
a photodetector;
a heterodyne optical system that splits output light of the laser into two components, uses one as probe light, uses the other as reference light, adds a frequency shift to one of the probe light and the reference light, applies the probe light to an object, combines scattered light from the object and the reference light, and causes the combined light to be incident on the photodetector;
an IQ demodulator that removes a component of the frequency shift, and outputs an in-phase component I and an orthogonal component Q by receiving a beat signal and an output of the heterodyne optical system as an input; and
an arithmetic operation processor that calculates a phase and a second frequency of the beat signal from the in-phase component I and the orthogonal component Q and excludes a component of a Doppler shift from the phase, calculates the average value of absolute values of one modulation period, and calculates the distance to the object on the basis of a proportional relationship between the distance and the average value of the absolute values of the phase which has been calibrated in advance.

2. The optical measurement device according to claim 1, wherein the arithmetic operation processor calculates the Doppler shift due to movement of the object and a velocity from an average value of one modulation period of the second frequency of the beat signal.

3. The optical measurement device according to claim 1, the optical measurement device further comprising a two-channel AD converter that acquires the in-phase component I and the orthogonal component Q detected by the IQ detector as a digital IQ signal,
wherein the digital IQ signal is input to the arithmetic operation processor and the phase and the second frequency of the beat signal are calculated from the digital IQ signal.

4. The optical measurement device according to claim 1, the optical measurement device further comprising a one-channel AD converter that acquires the beat signal generated from the photodetector as a digital RF signal,
wherein the IQ detector detects the in-phase component I and the orthogonal component Q from the digital RF signal, and
wherein the arithmetic operation processor calculates the phase and the second frequency of the beat signal from the in-phase component I and the orthogonal component Q.

5. The optical measurement device according to claim 1, wherein the frequency shift is greater than frequencies included in the in-phase component I and the orthogonal component Q.

6. The optical measurement device according to claim 1, wherein a frequency modulation signal of the laser is a sinusoidal wave.

7. An optical measurement method comprising:
splitting output light of a laser that outputs light of which a first frequency is modulated into two components, using one as probe light, using the other as reference light, adding a frequency shift to one of the probe light and the reference light, applying the probe light to an object, combining scattered light from the object and the reference light, and causing the combined light to be incident on a photodetector;
removing a component of the frequency shift, and outputting an in-phase component I and an orthogonal component Q by receiving a beat signal and an output of the combined light as an input;
calculating a phase and a second frequency of the beat signal from the in-phase component I and the orthogonal component Q; excluding a component of a Doppler shift from the phase;
calculating the average value of absolute values of one modulation period; and
calculating the distance to the object on the basis of a proportional relationship between the distance and the average value of the absolute values of the phase which has been calibrated in advance.

8. The optical measurement method according to claim 7, wherein the arithmetic operation of calculating the velocity of the object includes calculating the Doppler shift due to movement of the object and a velocity from an average value of one modulation period of the second frequency of the beat signal.

9. The optical measurement method according to claim 7, wherein the in-phase component I and the orthogonal component Q are converted to a digital IQ signal and the phase and the second frequency of the beat signal are calculated from the digital IQ signal at the time of detecting the in-phase component I and the orthogonal component Q of the beat signal generated from the photodetector and calculating the phase and the second frequency of the beat signal from the in-phase component I and the orthogonal component Q.

10. The optical measurement method according to claim 7, wherein the beat signal is converted to a digital RF signal, the in-phase component I and the orthogonal component Q are detected from the digital RF signal, and the phase and the second frequency of the beat signal are calculated from the in-phase component I and the orthogonal component Q at the time of detecting the in-phase component I and the orthogonal component Q of the beat signal generated from the photodetector and calculating the phase and the second frequency of the beat signal from the in-phase component I and the orthogonal component Q.

\* \* \* \* \*